(12) United States Patent
Tsuji et al.

(10) Patent No.: US 7,723,938 B2
(45) Date of Patent: May 25, 2010

(54) CONTROL SYSTEM FOR MULTIPHASE ROTARY ELECTRIC MACHINE

(75) Inventors: Hiroya Tsuji, Yokkaichi (JP); Shingo Kawasaki, Kariya (JP); Junji Miyachi, Okazaki (JP)

(73) Assignee: DENSO Coporation, Kariya (JP)

(*) Notice: Subject to any disclaimer, the term of this patent is extended or adjusted under 35 U.S.C. 154(b) by 400 days.

(21) Appl. No.: 11/785,817

(22) Filed: Apr. 20, 2007

(65) Prior Publication Data
US 2007/0249461 A1    Oct. 25, 2007

(30) Foreign Application Priority Data
Apr. 20, 2006    (JP)    ............... 2006-116602
Oct. 20, 2006    (JP)    ............... 2006-286739

(51) Int. Cl.
*H02P 7/00*    (2006.01)
*H02M 7/48*    (2007.01)

(52) U.S. Cl. ............... 318/432; 318/254; 318/400.05; 361/23; 361/37; 361/88

(58) Field of Classification Search ............... 318/139, 318/254, 379, 430, 432, 434, 439, 727, 400.05; 361/23–30, 37, 88
See application file for complete search history.

(56) References Cited

U.S. PATENT DOCUMENTS 5,469,351 A * 11/1995 Masrur et al. ............ 363/56.02
6,683,435 B1 * 1/2004 Liang et al. ............... 318/727
7,110,272 B2 * 9/2006 Nojima .................... 363/56.03
7,145,268 B2 * 12/2006 Edwards et al. ............ 307/127
7,199,538 B2 * 4/2007 Kameya ................ 318/400.05
7,279,862 B1 * 10/2007 Welchko et al. ............ 318/564
7,339,803 B2 * 3/2008 Nojima ..................... 363/37
7,489,487 B2 * 2/2009 Oka ......................... 361/79
2001/0041955 A1 * 11/2001 Nada ......................... 701/29
2003/0000485 A1 * 1/2003 Tomatsuri et al. .......... 123/41 E (Continued)

FOREIGN PATENT DOCUMENTS
JP    06-319263    11/1994

(Continued)

OTHER PUBLICATIONS

Chinese Office Action dated Mar. 6, 2009, issued in corresponding Chinese Application No. 200710100875.9, with English translation.

*Primary Examiner*—Paul Ip
(74) *Attorney, Agent, or Firm*—Nixon & Vanderhye P.C.

(57) ABSTRACT

A control system for multiphase rotary electric machines is provided. The control system carries out control of the output of a multiphase rotary electric machine by operating switching elements of an inverter, so that more appropriate measure can be taken when malfunction has occurred in the inverter. A rotary shaft of an internal combustion engine, a rotary shaft of a generator and a rotary shaft of a motor are linked through a torque-splitting mechanism. The control system carries out failsafe processes, at the occurrence of short circuit in a switching element of the inverter, to control load torque of the generator so as to prevent rotation of a rotary shaft of the internal combustion engine in a non-operative state, which rotation is induced by a motive force of the motor.

39 Claims, 21 Drawing Sheets

U.S. PATENT DOCUMENTS

| | | | |
|---|---|---|---|
| 2004/0125523 A1* | 7/2004 | Edwards et al. | 361/88 |
| 2004/0142790 A1* | 7/2004 | Tomura et al. | 477/2 |
| 2005/0163237 A1* | 7/2005 | Katanaya | 375/260 |
| 2005/0174076 A1* | 8/2005 | Katanaya | 318/254 |
| 2005/0281065 A1* | 12/2005 | Nojima | 363/98 |
| 2006/0061923 A1* | 3/2006 | Wang et al. | 361/23 |
| 2006/0245222 A1* | 11/2006 | Nojima | 363/132 |
| 2007/0240922 A1* | 10/2007 | Kikuchi | 180/65.4 |
| 2008/0067973 A1* | 3/2008 | Ishikawa et al. | 320/104 |

FOREIGN PATENT DOCUMENTS

JP  2006-296068  10/2006

* cited by examiner iu
iv
iw

CONTROL SYSTEM FOR MULTIPHASE ROTARY ELECTRIC MACHINE

CROSS-REFERENCE TO RELATED APPLICATION

This application is based on and claims the benefit of priority from earlier Japanese Patent Application Nos. 2006-116602 and 2006-286739 filed Apr. 20, 2006 and Oct. 20, 2006, respectively, the descriptions of which are incorporated herein by reference.

BACKGROUND OF THE INVENTION

1. Technical Field of the Invention

The present invention relates to a control system for multiphase rotary electric machines for controlling output of a multiphase rotary electric machine by operating switching elements of the inverter.

2. Related Art

A control system is known in which output torque of a three-phase motor is controlled with the operation of switching elements of an inverter. The inverter in this control system has three arms for bringing each of the three phases of the three-phase motor into electrical conduction with either a positive or negative side of a power supply voltage. In the control performed by this system, a short circuit that has occurred in a switching element of any one of the arms of the inverter may cause current to pass through the arm, incurring the risk of fluctuating torque or increasing the heating value of the inverter.

Japanese Patent Application Laid-Open No. 6-319263 suggests a system having means for detecting current that flows through each of the arms of an inverter. This system enables determination on the occurrence of short circuit at a switching element in any one of the arms of the inverter. This patent document also suggests providing a breaker circuit between an inverter and a power source, so that a flow of current can be shut down between the inverter and the power source as to the phase the short circuit has occurred.

The conventional system mentioned above has a breaker circuit for the purpose of avoiding the problems of torque fluctuation and heating caused by the short circuit. Provision of such a breaker circuit, however, may unignorably increase the number of parts and the size of an inverter circuit.

Recently, a system for hybrid vehicles has been put into practical use. In this system, rotary shafts for a three-phase motor and a three-phase generator are linked to a rotary shaft of an internal combustion engine through a torque-splitting mechanism. This system is adapted to control the output torque of the three-phase motor by operating the inverter at the time of stopping the internal combustion engine, and to allow the vehicle to travel with this output torque. Also, when the internal combustion engine is in operation, this system is adapted to operate the inverter to control an amount of generated power of the three-phase generator.

In the above system as well, the occurrence of short circuit at any one of the arms of the inverter for the three-phase generator may cause the problems of torque fluctuations of the generator and increase in the heating value of the inverter. Further, when the torque of the generator and the motor is transmitted to the rotary shaft through the torque-splitting mechanism, the rotary shaft of the internal combustion engine is rotated even when the internal combustion engine is stopped, incurring the risk of vibrating the power transmission system. Also, when short circuit occurs at any one of the arms of the inverter for the three-phase motor, limp home processes may desirably be carried out by using the output torque of the internal combustion engine as a driving force. However, the occurrence of short circuit may introduce load torque to the three-phase motor to cause difficulty in appropriately transmitting the output torque of the internal combustion engine to the drive wheels.

The conventional control system mentioned above does not take measures for such problems involved in the system for hybrid vehicles.

SUMMARY OF THE INVENTION

The present invention has been made in view of the problems provided above and has as its object to provide a control system for multiphase rotary electric machines, in which the output of a multiphase rotary electric machine is controlled by operating the switching elements of an inverter. In particular, the present invention has an object of providing a control system for multiphase rotary electric machines, which can more appropriately cope with malfunction of an inverter.

In order to achieve above object, the present invention provides, as one aspect thereof, an apparatus for controlling torque of a rotary shaft of a first rotary electric machine mechanically coupled with both a rotary shaft of a second rotary electric machine and a rotary shaft of an internal combustion engine via a torque-splitting mechanism splitting torque from the internal combustion engine to the first and second rotary electric machines, the first rotary electric machine being composed as a multiphase rotary electric machine. The apparatus comprises an inverter used to control the torque of the rotary shaft of the first rotary electric machine; a determining component determining whether or not a condition is met, the condition being defined such that there is caused a malfunction at the inverter and the internal combustion engine is in a non-operation state; and a limiting component limiting a rotation state of the rotary shaft of the internal combustion engine, which is caused by the second electric machine and transferred via the torque-splitting mechanism from the second rotary electric machine, by operating a drive state of the first rotary electric machine, when it is determined by the determining component that the condition is met.

In the above configuration, malfunction in the inverter may not allow appropriate torque control of the rotary shaft of the multiphase rotary electric machine (i.e., the first rotary electric machine). Specifically, under such circumstances, when the rotary machine is in operation, the motive power (torque of the rotary shaft) is transmitted to the rotary shaft of the internal combustion engine through the torque-splitting mechanism. Accordingly, even when the internal combustion engine is not in operation, its rotary shaft may be rotated. In this regard, the configuration described above can limit the rotation of the rotary shaft by carrying out an operation of the electrical conditions of the multiphase rotary electric machine, as failsafe processes during malfunction of the inverter. Thus, malfunction of the inverter for the multiphase rotary machine can appropriately prevent drawbacks, such as the occurrence of vibration in the power transmission system.

Preferably, the limiting component is configured to limit, as the rotation state of the rotary shaft of the internal combustion engine, a revolution speed of the rotary shaft of the internal combustion engine from entering a revolution speed range which is larger than zero and less than an idling revolution speed of the internal combustion engine.

The above configuration can prevent the revolution speed of the rotary shaft of the internal combustion engine from falling in a range where the revolution speed is larger than zero and smaller than idling revolution speed. Thus, the revolution speed of the rotary shaft of the internal combustion engine can be appropriately prevented from turning into a revolution speed which would not happen in a normal operative condition.

Still preferably, the internal combustion engine is provided with a is flywheel damper for suppressing vibration thereof and the limiting component is configured to limit a revolution speed of the rotary shaft of the internal combustion engine so that the revolution speed is kept away from being present within a revolution speed range corresponding to a resonance frequency of the flywheel damper.

The configuration mentioned above can prevent the revolution speed of the rotary shaft of the internal combustion engine from failing in the range where the revolution speed corresponds to the resonance frequency. Thus, the vibration caused in the system can be appropriately suppressed.

It is preferred that the limiting component is configured to set the torque of the rotary shaft of the first rotary electric machine to a torque that stops rotation of the rotary shaft of the internal combustion engine.

The above configuration can control torque of the rotary shaft of the multiphase rotary machine so as to stop rotation of the rotary shaft of the internal combustion engine. Thus, drawbacks accompanying the rotation of the rotary shaft of the internal combustion engine can be appropriately avoided.

It is also preferred that the limiting component is configured to limit the revolution speed of the rotary shaft of the internal combustion engine by switching the switching elements of the inverter.

The above configuration enables the limitation mentioned above with the operation of the switching elements of the inverter, whereby the continuity of current in the multiphase rotary machine can be maintained when carrying out the failsafe processes. Thus, generation of arc current, which would have been caused by forcedly zeroing the current in the multiphase rotary machine, can be appropriately avoided.

As another aspect, the present invention provides an apparatus for controlling an output of a multiphase rotary electric machine by operating on/off states of an inverter comprising a plurality of phase arms each composed of a plurality of switching elements respectively being turned on/off, comprising: a determining component determining whether or not a condition is met, the condition being defined such that there is a short-circuit malfunction caused at any one of the switching elements of any one of the phases and the multiphase rotary electric machine rotates at a speed higher than a predetermined speed; and a control component performing control such that all other switching elements are made to be on-state, the other switching elements belonging to phase arms having no short-circuit and being connected to an electric path to which the switching element having the short-circuit malfunction is connected, when it is determined by the determining component that the condition is met.

The above configuration allows short circuit to occur in all of the phases through an input terminal of the inverter, to which the short-circuited switching element is connected, when the revolution speed is equal to or higher than the preset speed. Thus, the current passing through the multiphase rotary electric machine turns into a current that flows with the counter electromotive force. In this case, the counter electromotive force is substantially orthogonal to the current. As a result, the value of the current passing through the multiphase rotary electric machine can be prevented from becoming large, the absolute value of the torque of the multiphase rotary electric machine can be prevented from becoming large, and the torque can be prevented from fluctuating.

As another aspect, the present invention provides an apparatus for controlling an output of a multiphase rotary electric machine by operating on/off states of an inverter comprising a plurality of phase arms each composed of a plurality of switching elements respectively being turned on/off, comprising: a determining component determining whether or not a condition is met, the condition being defined such that there is a short-circuit malfunction caused at any one of the switching elements of any one of the phase arms; and a control component performing control such that all other switching elements are made to be on-state, the other switching elements belonging to phases having no short-circuit and being connected to an electric path to which the switching element having the short-circuit malfunction is connected, when it is determined by the determining component that the condition is met.

At the occurrence of malfunction in the switching element, the above configuration can appropriately prevent the output torque of the multiphase rotary electric machine or the current passing through the multiphase rotary electric machine from becoming excessively large.

As another aspect, the present invention provides an apparatus for controlling an output of a multiphase rotary electric machine by operating on/off states of an inverter comprising a plurality of phase arms each composed of a plurality of switching elements respectively being turned on/off, comprising: an electric-conduction device electrically intervening between the multiphase rotary electric machine and the inverter and being selectively conductive or non-conductive therebetween; a determining component determining whether or not a condition is met, the condition being defined such that there is a short-circuit malfunction caused at any one of the switching elements of any one of the phase arms; and a controlling component controlling the electric-conduction device into a non-conductive state, when it is determined by the determining component such that the condition is met.

When malfunction is determined as being present, the above configuration shuts down between the multiphase rotary electric machine and the inverter to insulate between the phases of the multiphase rotary electric machine. Thus, the current that passes through the multiphase rotary electric machine can be zeroed, so that the torque can be substantially zeroed.

As another aspect, the present invention provides an apparatus for controlling torque of a rotary shaft of a multiphase electric motor mechanically coupled with both a rotary shaft of a rotary electric machine and a rotary shaft of an internal combustion engine via a torque-splitting mechanism splitting torque from the internal combustion engine to the multiphase electric motor and the rotary electric machine, the apparatus comprising: a determining component determining whether or not there is caused a malfunction at the inverter; and a limiting component limiting a load toque of the multiphase electric motor by operating electric states of the multiphase electric motor, when it is determined by the determining component that there is caused the malfunction.

When malfunction occurs in the inverter, the output of the multiphase motor cannot be controlled to be a desired level, which may cause the output torque of the multiphase motor to turn into load torque. In this case, it may be difficult to obtain required driving force. In this regard, the above configuration may limit the load torque of the multiphase motor to mitigate such a problem.

DETAILED DESCRIPTION OF THE PREFERRED EMBODIMENTS

First Embodiment

Hereinafter is described a first embodiment of the present invention with reference to the accompanying drawings. In the present embodiment, a control system for multiphase rotary electric machines of the present invention is applied to a system loaded on a hybrid vehicle.

Figure 1:
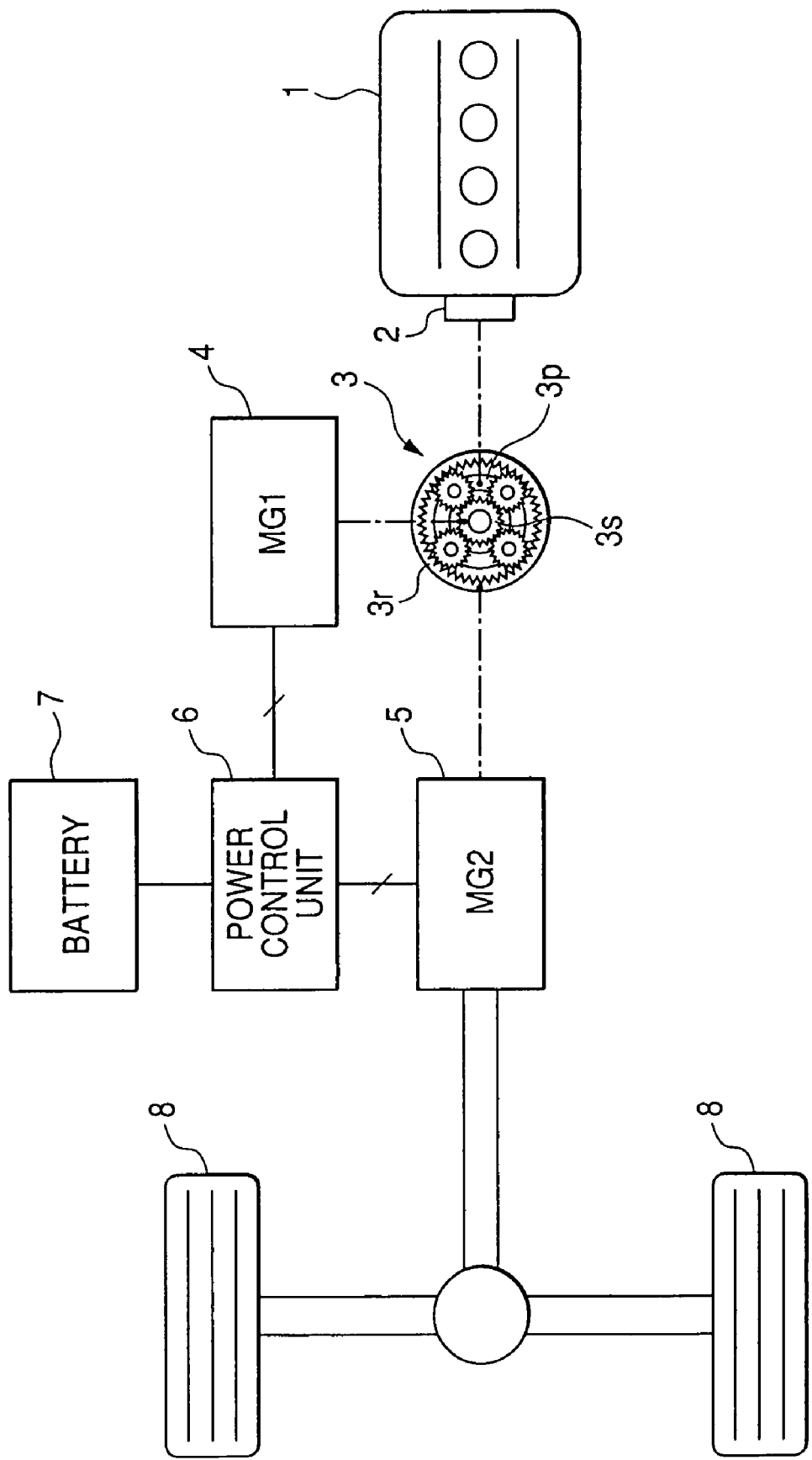
FIG. 1 is a schematic diagram illustrating a general configuration of a system for a hybrid vehicle, according to a first embodiment of the present invention.

FIG. 1 is a schematic diagram illustrating a general configuration of a power transmission system of the hybrid vehicle mentioned above.

As shown in FIG. 1, an internal combustion engine 1 is provided with a flywheel damper 2 for suppressing vibration of the internal combustion engine 1. The motive power of the internal combustion engine 1 is distributed to a first motor-generator (generator 4) and a second motor-generator (motor 5) through a torque-splitting mechanism 3. In particular, the torque-splitting mechanism 3 is made up of a planetary gear mechanism. In the planetary gear mechanism, a planetary gear 3p is connected to a rotary shaft of the internal combustion engine, a sun gear 3s is connected to a rotary shaft of the generator 4, and a ring gear 3r is connected to a rotary shaft of the motor 5. The generator 4 and the motor 5 are each made up of DC brushless motors.

Load torque of the generator 4 and output torque of the motor 5 are controlled by a power control unit 6 to which a battery 7 is connected. The energy generated by the generator 4 is charged to the battery 7 through the power control unit 6. The electric power of the battery 7 brings the motor 5 into operation. The output torque of the motor 5 is transmitted to drive wheels of the vehicle.

Figure 2:
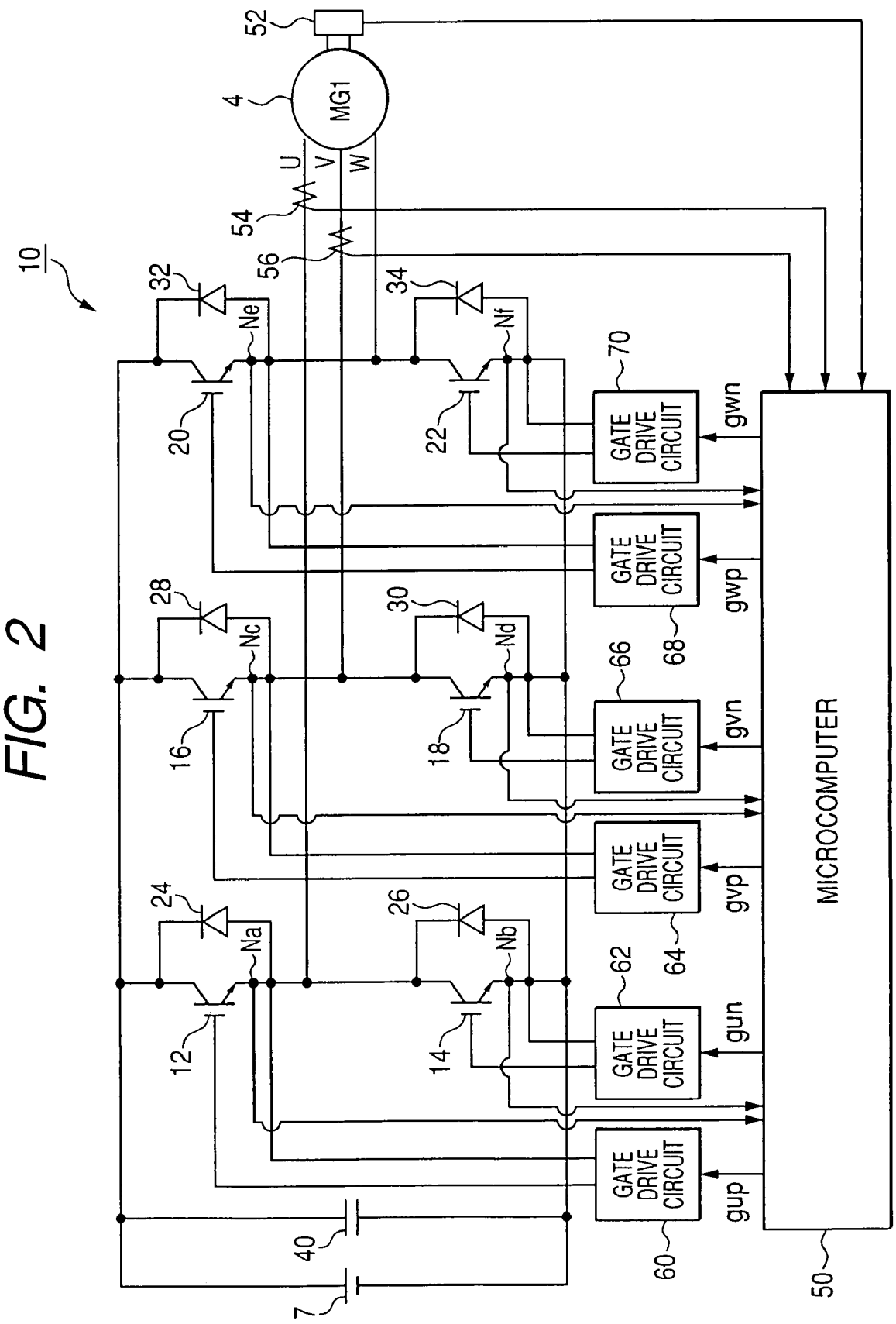
FIG. 2 is a schematic diagram illustrating a configuration including a generator, an inverter and a microcomputer, according to the first embodiment.

FIG. 2 particularly illustrates a portion of the power control unit 6, which is associated with control of the generator 4.

As shown in FIG. 2, an inverter 10 is connected to three phases (U-phase, V-phase and W-phase) of the generator 4. The inverter 10 is a three-phase inverter made up of a parallel-connected body in which three sets of switching elements, i.e. switching elements 12, 14 (U-phase arm), switching elements 16, 18 (V-phase arm) and switching elements 20, 22 (W-phase arm) are connected in parallel so as to establish electrical connection between each of the three phases and a positive or a negative side of the battery 7. The inverter 10 is also provided with flywheel diodes 24, 26, 28, 30, 32 and 34 which are in anti-parallel connection with the switching elements 12, 14, 16, 18, 20 and 22, respectively. A connecting point for serially connecting the switching elements 12 and 14 is connected to the U-phase of the generator 4. A connecting point for serially connecting the switching elements 16 and 18 is connected to the V-phase of the generator 4. A connecting point for serially connecting the switching elements 20 and 22 is connected to the W-phase of the generator 4. It should be appreciated that, in the present embodiment, these switching elements 12, 14, 16, 18, 20 and 22 are each made up of an insulated gate bipolar transistor (IGBT).

A smoothing capacitor 40 is connected to both ends of each of the three sets of the switching elements 12, 14, the switching elements 16, 18 and the switching elements 20, 22.

The microcomputer 50 is connected to a position sensor 52 for detecting rotation angle of the rotary shaft of the generator 4, and to current sensors 54 and 56 for detecting current passing through the U-phase and V-phase, respectively. The microcomputer 50 retrieves results of detection made by these detectors and calculates current passing through the W-phase based on the current passing through the U-phase and the current passing through the V-phase, according to Kirchhoff's law. The microcomputer 50 operates the switching elements 12, 14, 16, 18, 20 and 22 through gate drive circuits 60, 62, 64, 66, 68 and 70, respectively, based, for example, on the rotation angle of the rotary shaft of the generator 4 and the currents passing through the three phases. Further, the microcomputer 50 has a function of detecting currents passing through the switching elements 12, 14, 16, 18, 20 and 22 as currents passing through nodes Na, Nb, Nc, Nd, Ne and Nf, respectively, and detecting presence of malfunction in the inverter 10 based on the detected currents.

Figure 3:
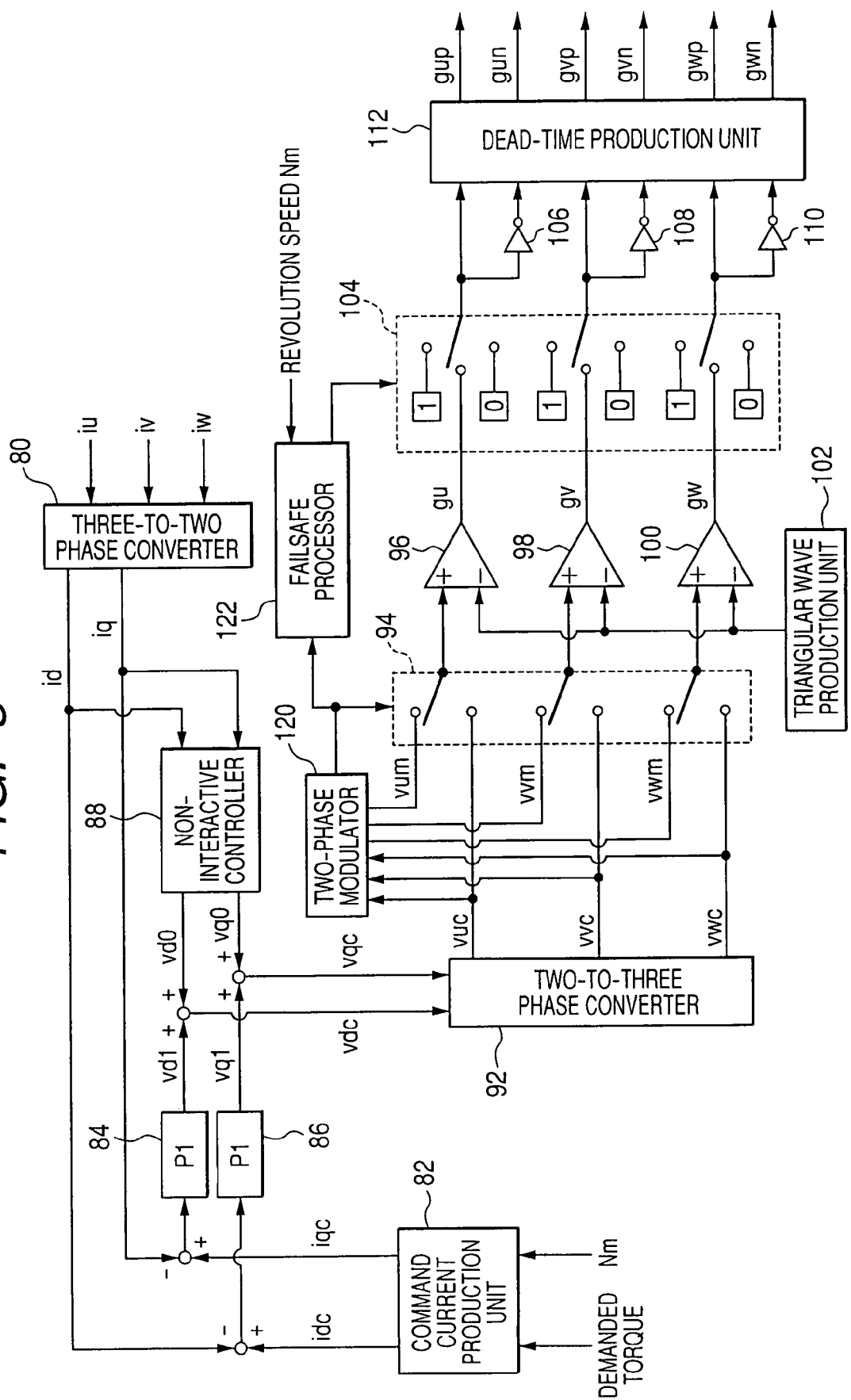
FIG. 3 is a functional block diagram illustrating processes in the microcomputer, according to the first embodiment.

FIG. 3 is a block diagram illustrating processes carried out by the microcomputer 50. In the present embodiment, the load torque of the generator 4 is controlled to a demanded torque by basically effecting triangular wave PWM (pulse width modulation) control. The following description is focused, in particular, on the process associated with the triangular wave PWM control among the processes shown in FIG. 3.

A three-to-two-phase converter 80 performs coordinate conversion into d-q axis of actual current iu that passes through the U-phase and actual current iv that passes through the V-phase, which are detected by the current sensors 54 and 56, respectively, and actual current iw that passes through the W-phase, which is calculated from the actual currents iu and iv so as to produce actual current id and actual current iq. Since the coordinate conversion uses the rotation angle of the generator 4, a rotation angle θ is inputted to the three-to-two phase converter 80 by the position sensor 52. A command current production unit 82 produces command currents iqc and idc according, for example, to a demanded torque and a revolution speed Nm as a time differential value of the rotational angle θ. The command currents iqc and idc are reflected as command values on the d-q axis.

A PI controller 84 calculates a proportional term and an integral term based on a difference between the command current idc and the actual current id. The calculated value is outputted from the PI controller 84 as a first command voltage vd1. A PI controller 86 calculates a proportional term and an integral term based on a difference between the command current iqc and the actual current iq. The calculated value is outputted from the PI controller 86 as a first command voltage vq1. Behaviors of the first command voltages vd1 and vq1 will now be explained below.

The following relations are established between voltages vu, vv and vw applied to the respective three phases, counter electromotive forces eu, ev and ew produced in the respective three phases, a resistance R of the generator 4, a self inductance L', a mutual inductance M and a time differential operator P:

$$vu=(R+PL')\times iu-\tfrac{1}{2}\times PM\times iv-\tfrac{1}{2}\times PM\times iw+eu$$

$$vv=-\tfrac{1}{2}\times PM\times iu+(R+PL')\times iv-\tfrac{1}{2}\times PM\times iw+ev$$

$$vw=-\tfrac{1}{2}\times PM\times iu-\tfrac{1}{2}\times PM\times iv+(R+PL')\times iw+ew$$

When d-q axis conversion is performed, voltages vd and vq of a d-axis and a q-axis, respectively, are obtained from the following formulas (cd) and (cq) by using a revolution speed ω, an inductance L (=L'+³⁄₂×M), and a counter electromotive force ωφ:

$$vd=(R+PL)\times id-\omega L\times iq \quad (cd)$$

$$vq=\omega L\times id+(R+PL)\times iq+\omega\phi \quad (cq)$$

As can be seen from the above formulas (cd) and (cq), axial components of the voltages applied to the generator 4 include not only those terms which are in proportion to the same axial components in the current that passes through the generator 4, but also those terms which are in proportion to different axial components and counter electromotive force ωφ (hereinafter, these are referred to as "interference terms").

In the present embodiment, these interference terms are calculated by a non-interactive controller 88 based on the actual currents id and iq to further calculate zero-th command voltages vd0 and vq0. Then, the first command voltage vd1 and the zero-th command voltage vd0 are added to obtain a command voltage vdc for the d-axis. Similarly, the first command voltage vq1 and the zero-th command voltage vq0 are added to obtain a command voltage vqc for the q-asix.

The command voltage vdc for the d-axis and the command voltage vqc for the q-axis are retrieved by a two-to-three phase converter 92. The two-to-three phase converter 92 converts the command voltage vdc for the d-axis and the command voltage vqc for the q-axis into a command voltage vuc for the U-phase, a command voltage vvc for the V-phase and a command voltage vwc for the W-phase. These command voltages vuc, vvc and vwc are the voltages that should be applied to the respective phases of the generator 4 when command currents are passed to the respective phases. The command voltages vuc, vvc and vwc are sine waves with each of the centers of voltages being zeroed. The command currents for the individual phases of the generator 4 refer to those command currents in the respective three phases, which are determined based on the command currents idc and iqc mentioned above.

The command voltages vuc, vvc and vwc are applied to noninverting input terminals of comparators 96, 98 and 100, respectively, through a switching portion 94. The comparators 96, 98 and 100 compare magnitude of the respective command voltages vuc, vvc and vwc with that of a triangular carrier wave which is produced by the triangular wave production unit 102. Output signals gu, gv and gw of the respective comparators 96, 98 and 100 are produced by subjecting the command voltages vuc, vvc and vwc to pulse width modulation (PWM).

The output signals gu, gv and gw are retrieved by a switching portion 104. The signals outputted from the switching portion 104 and their inversion signals inverted by inverters 106, 108 and 110 are retrieved by a dead-time production unit 112. In the dead-time production unit 112, the outputted signals mentioned above and the inversion signals corresponding thereto are subjected to waveform shaping so as to avoid overlapping of the edges of these signals, i.e. to avoid coincidence of timing. The waveform-shaped signals serve as an operation signal gup for operating the switching element 12 of the U-phase, an operation signal gun for operating the switching element 14 of the U-phase, an operation signal gvp for operating the switching element 16 of the V-phase, an operation signal gvn for operating the switching element 18 of the V-phase, an operation signal gwp for operating the switching element 20 of the W-phase and the operation signal gwn for operating the switching element 22 of the W-phase.

Figure 4A:
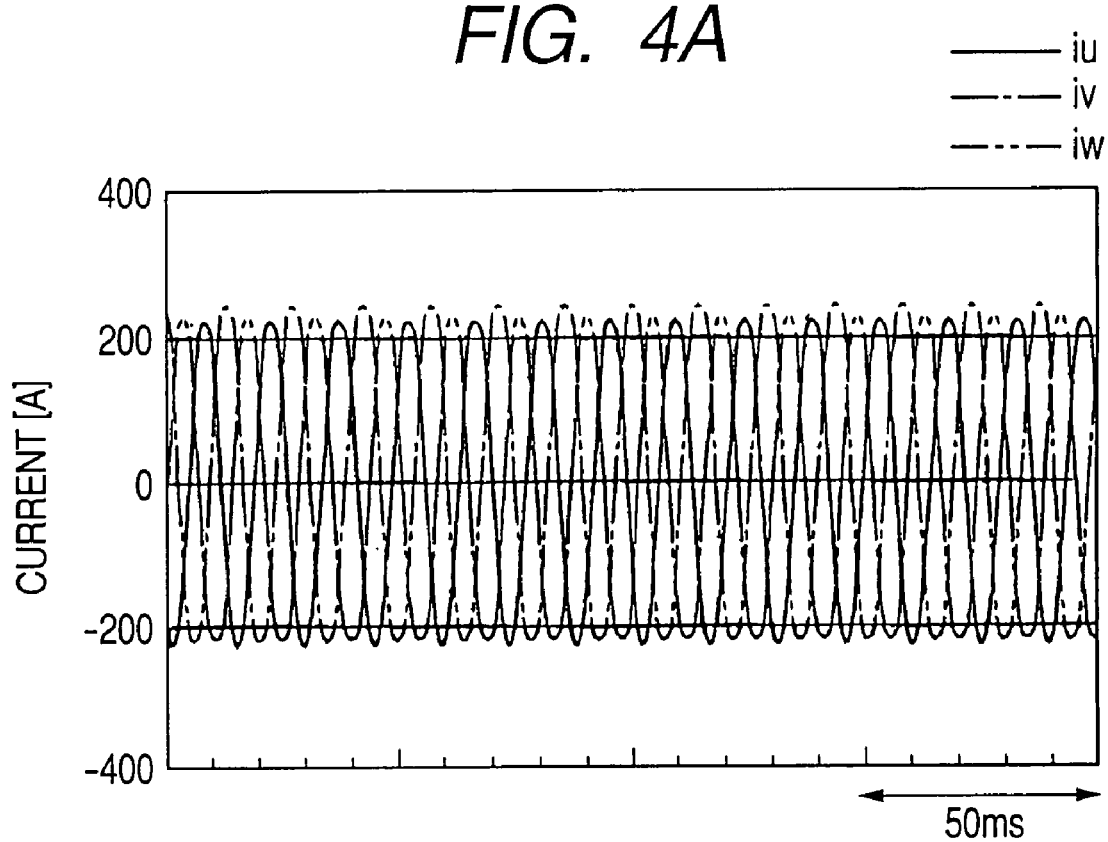
FIGS. 4A and 4B are time diagrams illustrating transitions of current and torque of the generator in normal operation, according to the first embodiment.
Figure 4B:
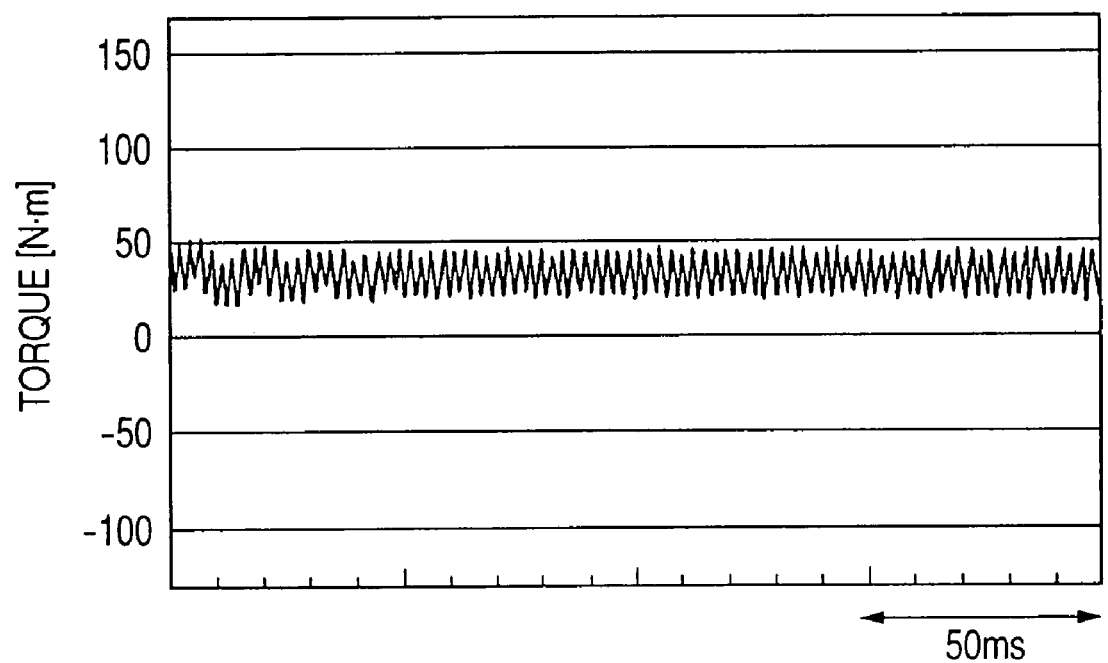

In the configuration described above, when the output signals gu, gv and gw have been selected by the switching portion 104, the switching elements 12, 14, 16, 18, 20 and 22 are operated by the PI (proportional-integral) control, so that the actual currents iu, iv and iw may be in accord with the currents for the three phases (command currents), which are determined based on the command currents idc and iqc. In this case, being in accord with the command voltages vuc, vvc and vwc, the voltages applied to the three phases each have a sine wave whose center of amplitude is zero. FIG. 4A illustrates transition of the actual currents iu, iv and iw under the PWM control, and FIG. 4B illustrates transition of torque of the generator 4. It is exemplified here a case where the torque of the rotary shaft of the generator 4 is positive, i.e. a case where the generator 4 functions as a motor.

In the processes carried out by the microcomputer 50, hereinafter is described, in particular, a process carried out at the occurrence of short circuit, which brings about a state of constant electrical conduction in any of the switching elements 12, 14, 16, 18, 20 and 22 in any of the arms (a serially-connected body of the switching elements 12, 14, a serially-connected body of the switching elements 16, 18 and a serially-connected body of the switching elements 20, 22) of the inverter 10. In the present embodiment, it is determined first whether or not a pass-through current passes through the two switching elements of any of the arms, based on current that passes through the nodes Na, Nb, Nc, Nd, Ne and Nf shown in FIG. 2. When the pass-through current is determined as passing through an arm, the arm is regarded as causing the malfunction. Then, all of the switching elements 12, 14, 16, 18, 20 and 22 are operated and turned off. As a result, those switching elements causing no short circuit are brought into a state of non-conduction. However, when only one of the switching elements 12, 14, 16, 18, 20 and 22 is short-circuited, current is allowed to pass through the generator 4 because a closed-loop circuit is formed by the subject short-circuited switching element, some of the flywheel diodes 24, 26, 28, 30, 32 and 34, the generator 4 and the battery 7.

Figure 5A:
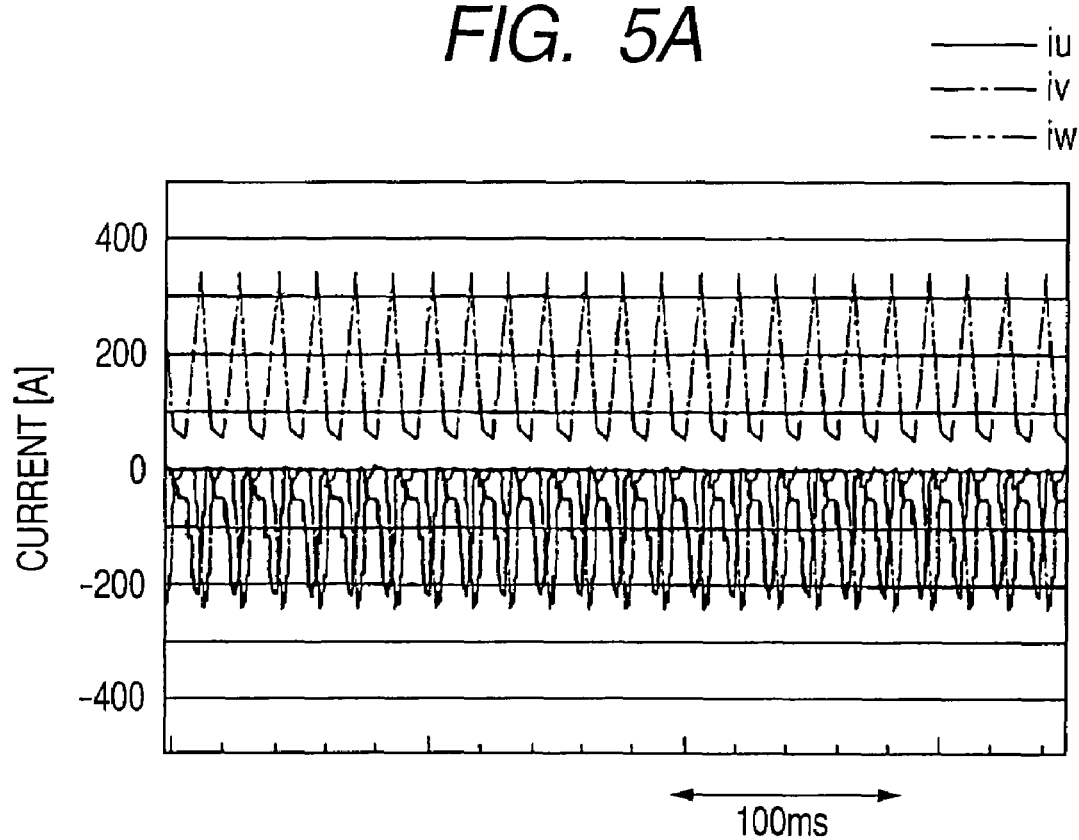
FIGS. 5A and 5B are time diagrams illustrating transitions of current and torque of the generator under one-phase short circuit control, according to the first embodiment.
Figure 5B:
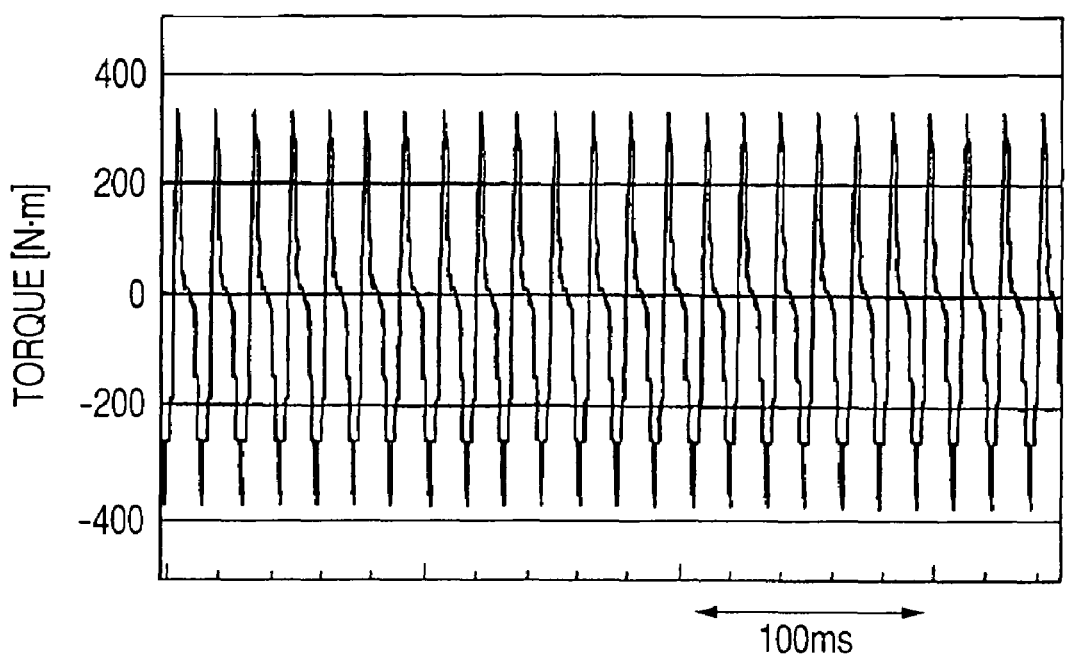

FIG. 5A illustrates transition of the actual currents iu, iv and iw in case where the switching elements 12, 14, 16, 18 and 22 are in an off-state at the occurrence of short circuit in the switching element 20 in the W-phase arm. FIG. 5B illustrates torque of the generator 4 at the occurrence of this short circuit in the switching element 20. As can be seen, an average value of the actual current iw is larger than average values of the actual currents iu and iv by a predetermined offset amount. On the other hand, when short circuit has occurred in the switching element 22, for example, the average value of the actual current iw becomes smaller than the average values of the actual currents iu and iv by the predetermined offset amount. Thus, when an average value of an actual current of any one of the phases is offset with respect to the average values of the actual currents in other two phases, a determination can be made, based on the amount of offset, that short circuit has occurred in a specific switching element in the switching elements 12, 14, 16, 18, 20 and 22.

Figure 6:
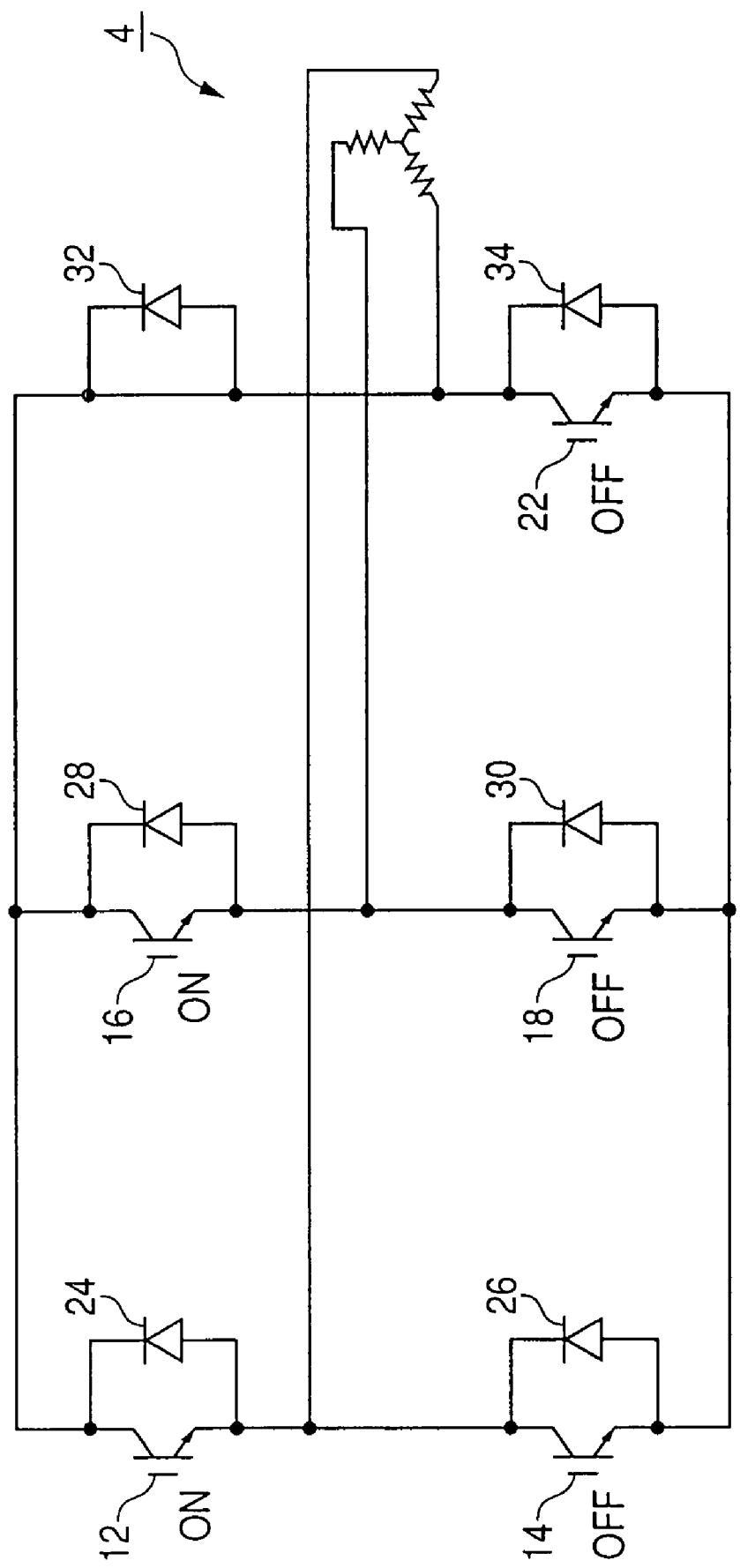
FIG. 6 is a circuit diagram illustrating a mode of three-phase short circuit control.

In case any of the switching elements 12, 14, 16, 18, 20 and 22 is determined as having short circuit, among the switching elements in other two normal phases, those which correspond to the short-circuited switching element are all brought into a state of conduction. For example, as shown in FIG. 6, when short circuit has occurred in the switching element 20 of the W-phase, the switching elements 12 and 16 are turned on and other switching elements are turned off. In this way, all of the three phases of the generator 4 can be short-circuited (three-phase short circuit control). Thus, while current passes through the generator 4 with the counter electromotive force produced in the generator 4, the actual currents iu, iv and iw of the three phases become substantially equal to each other except for the phase offset.

Figure 7A:
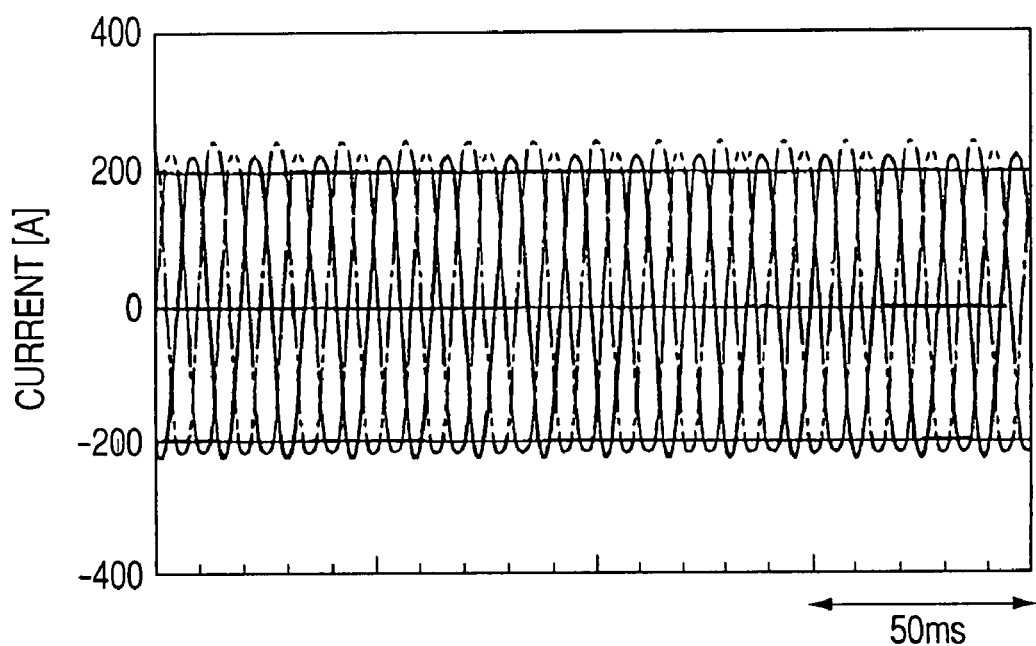
FIGS. 7A and 7B are time diagrams illustrating transitions of current and torque of the generator under the three-phase short circuit, control according to the first embodiment.
Figure 7B:
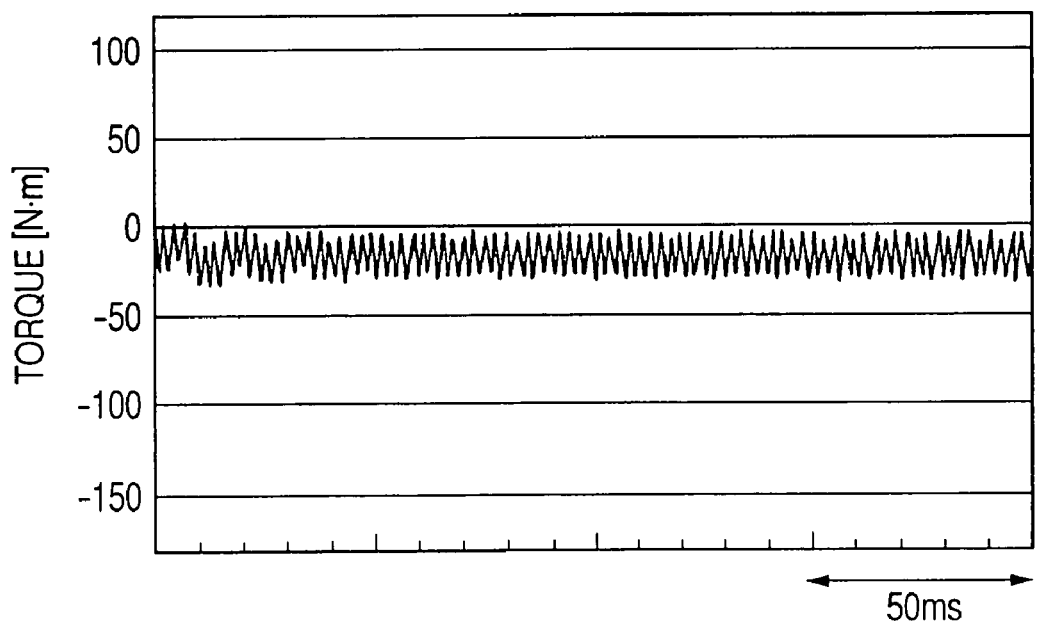

FIG. 7A illustrates transition of the actual currents iu, iv and iw in the motor 5 under the three-phase short circuit control, and FIG. 7B illustrates transition of torque of the rotary shaft of the generator 4 in the transition illustrated in FIG. 7A. As can be seen, the actual currents iu, iv and iw are in a stable state, taking the form of sine waves whose amplitudes and centers of amplitudes are equal to each other. Further, an absolute value of the torque of the generator 4 is also in a stable state at a low level. Thus, under the occurrence of short circuit in the switching element 20, the problems of torque fluctuations and heating can be appropriately prevented. In addition, fixedly off state of the switching element 22 may prevent the pass-through current.

Figure 8A:
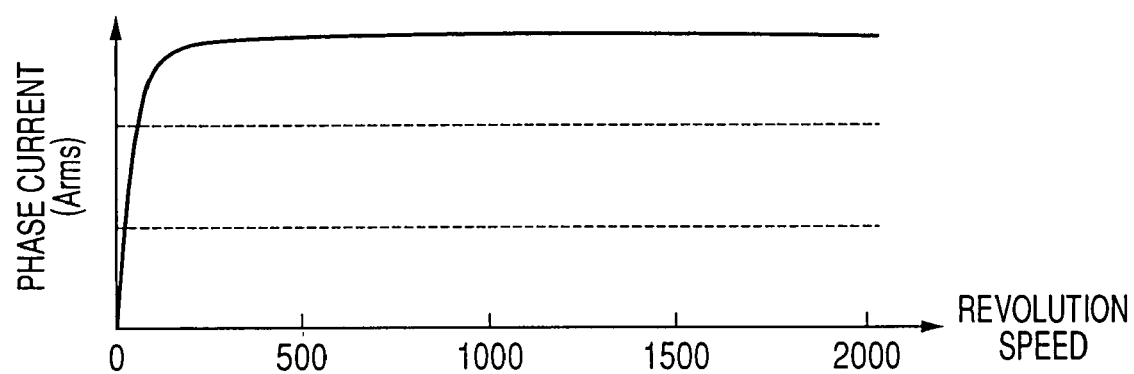
FIGS. 8A and 8B are illustrations showing current and torque relative to revolution speed in the three-phase short circuit control.
Figure 8B:
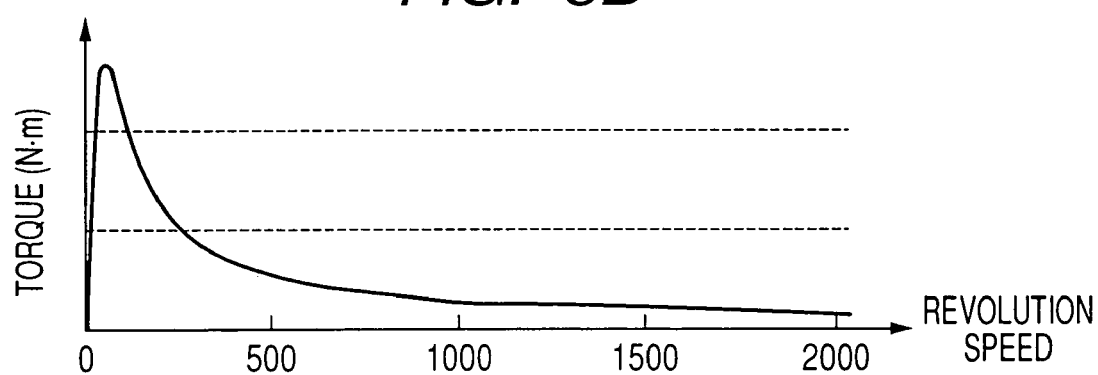

However, under the three-phase short circuit control, the absolute value of torque increases in a low revolution speed region of the generator 4. FIG. 8A illustrates revolution speed relative to phase currents (actual currents iu, iv and iw) under the three-phase short circuit control, and FIG. 8B illustrates revolution speed relative to absolute value of torque under the three-phase short circuit control. It should be appreciated that, in FIG. 8B, the torque indicates load torque (<0: torque that stops rotation of the rotary shaft). As shown, as the revolution speed decreases, the actual currents iu, iv and iw decrease and the torque increases. This is because the inductance component (PL in the above formulas (cd) and (cq)) of the voltages vd and vq increases and the inductance component is orthogonal to the currents iq and id, and thus because the power factor decreases as the revolution speed increases.

Thus, use of the three-phase short circuit control in the low revolution speed region increases the load torque of the generator 4. In this case, the internal combustion engine 1 is regarded as being in a non-operative state (having stopped fuel injection control). If the motor 5 is in operation under such circumstances, rotation may be induced to the rotary shaft of the internal combustion engine 1. In particular, as shown in the alignment diagram of FIG. 9, the revolution speeds of the motor 5, the internal combustion engine 1, and the generator 4 establish a relation of being connected with a straight line. Therefore, in order to gradually raise the revolution speed of the motor 5 while the internal combustion engine 1 is being stopped, the revolution speed of the generator 4 is required to be raised as indicated by the dashed-two dotted line in FIG. 9. However, large load torque in the low revolution speed region may prevent the revolution speed of the generator 4 from increasing. As a result, as indicated by the dotted line in FIG. 9, the revolution speed of the internal combustion engine 1 is increased. In this case, the revolution speed of the internal combustion engine 1 may hover around a revolution speed lower than the idling revolution speed (>0).

On the other hand, a region of revolution speed lower than the idling revolution speed includes a region of revolution speed corresponding to the resonance frequency of the flywheel damper 2 mentioned above. Therefore, performing the three-phase short circuit control in the low revolution speed region of the generator 4 may allow the revolution speed of the internal combustion engine 1 to fall in the region of revolution speed corresponding to the resonance frequency, thereby causing pronounced vibration.

Under the circumstances, in the low revolution speed region of the generator 4, all of the non-short-circuited switching elements in the switching elements 12, 14, 16, 18, 20 and 22 could be turned off so as to be brought into a state of non-conduction (one-phase short circuit control). This one-phase short circuit control can reduce the load torque in the low revolution speed region of the generator 4. However, the one-phase short circuit control and the three-phase short circuit control still allow the presence of the low revolution speed region of the generator 4, which allows rotation of the rotary shaft of the internal combustion engine 1 to be initiated.

Figure 10:
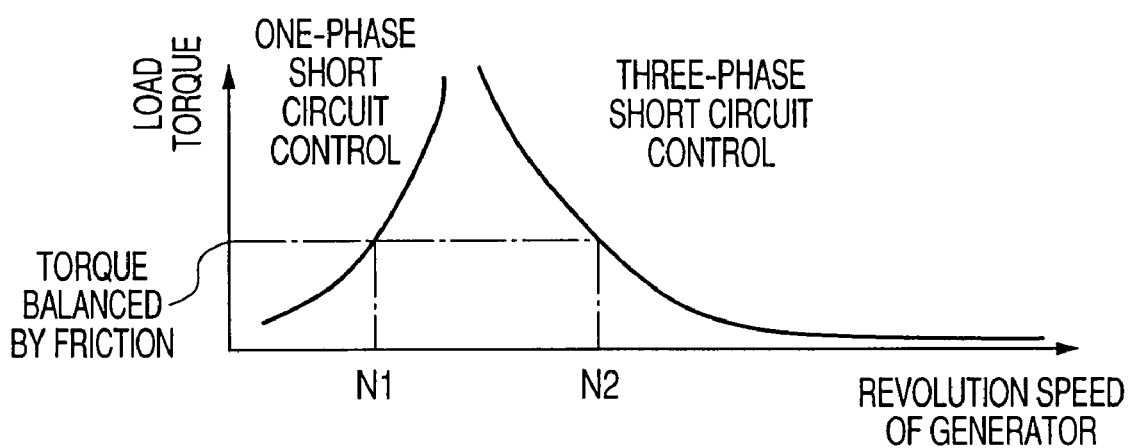
FIG. 10 is an illustration showing a relation between revolution speed and loading under the one-phase and the three-phase short circuit controls.

FIG. 10 illustrates the load torque caused in the generator 4 relative to the revolution speed under the one-phase short circuit control and the three-phase short circuit control. As shown in FIG. 10, under the one-phase short circuit control, although the low revolution speed region of the generator 4 causes small load torque, the load torque increases as the revolution speed increases. At a revolution speed N1, the load torque of the generator 4 turns to a torque balanced by friction torque of the internal combustion engine 1, which is indicated by the dashed-dotted line in FIG. 10. The torque balanced by the friction torque refers to a minimum torque that allows rotation of the rotary shaft of the internal combustion engine 1 to be initiated conquering the friction of the internal combustion engine 1. Specifically, when the revolution speed of the generator 4 exceeds the revolution speed N1, the motive power of the motor 5, which is transmitted through the torque-splitting mechanism 3, accelerates the rotation of the rotary shaft of the internal combustion engine 1 against the friction torque of the internal combustion engine 1, according to the principle of dynamics, without accelerating the rotation of the rotary shaft of the generator 4 against the load torque of the generator 4. Accordingly, as the revolution speed of the motor 5 increases, rotation of the internal combustion engine 1 is initiated.

Figure 9:
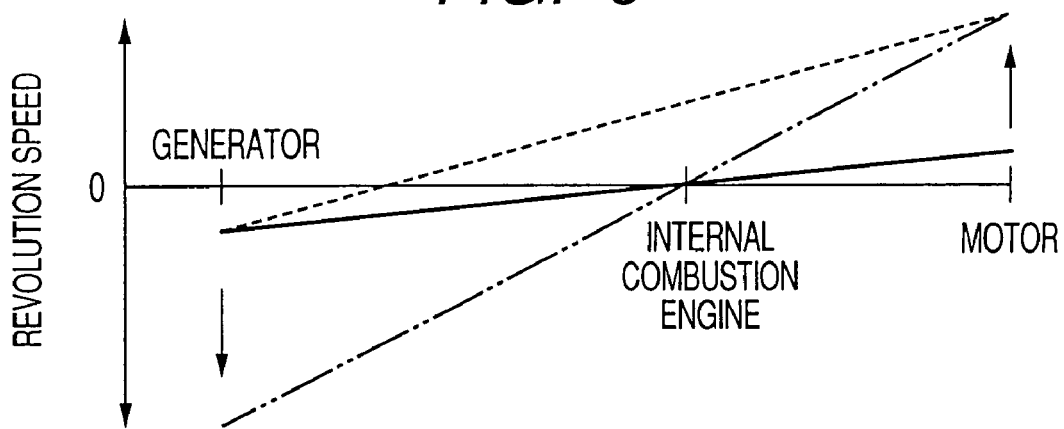
FIG. 9 is an alignment diagram for setting a relation between revolution speeds of the generator, an internal combustion engine and a motor, according to the first embodiment.

Under the three-phase short circuit control, although a high revolution speed region of the generator 4 causes small load torque, the load torque increases as the revolution speed decreases. Thus, at a revolution speed N2, which is higher than the revolution speed N1, the load torque of the generator 4 turns to torque balanced by the friction torque. Therefore, as shown in FIG. 9, in gradually increasing the revolution speed of the motor 5, rotation of the rotary shaft of the internal combustion engine 1 is initiated in a region between the revolution speed N1 and the revolution speed N2 irrespective of the transition of control from the one-phase short circuit control to the three-phase short circuit control. Thus, the increase in the revolution speed of the motor 5 causes the increase in the revolution speed of the internal combustion engine 1, which may prevent the revolution speed of the generator 4 from being raised up to the revolution speed N2.

Figure 11:
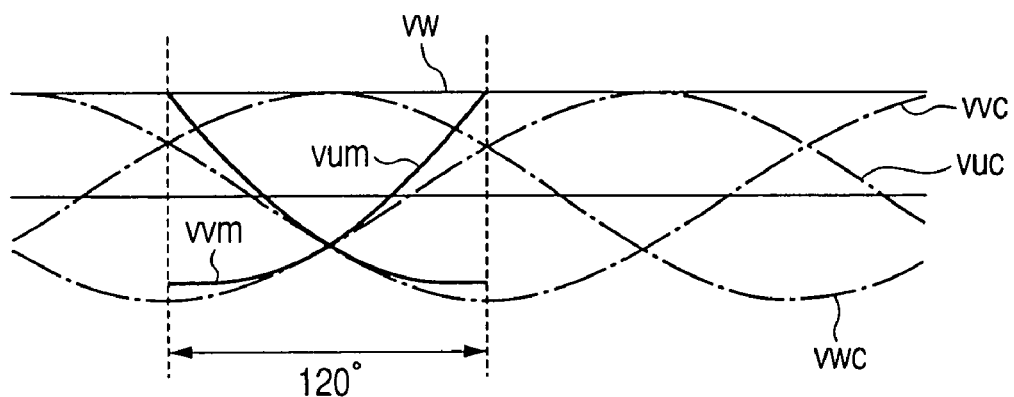
FIG. 11 is a time diagram illustrating a mode of two-phase modulation, according to the first embodiment.

When the revolution speed of the generator 4 is increased by the increase of the revolution speed of the motor 5, the system of the present embodiment carries out the processes shown in FIG. 11 in order to have the revolution speed transited from the revolution speed N1 to the revolution speed N2. In FIG. 11, the dashed-dotted lines indicate the command voltages vuc, vvc and vwc of the three phases. As shown in the figure, each of the command voltages vuc, vvc and vwc of the three phases becomes closer to the positive potential of the inverter 10 than other two phases over ⅓ of a period, and becomes closer to the negative potential of the inverter 10 than other two phases over ⅓ of a period.

In this case, when short circuit is caused in the switching element 20 in the W-phase, for example, the voltage vw of the W-phase is fixed at the positive potential of the inverter 10 as shown in FIG. 11. Under the circumstances, if phase-to-phase voltages determined by two of the command voltages vuc, vvc and vwc for the three phases are made equal to the actual phase-to-phase voltages, it is possible to actually pass the command currents for the three phases determined by the command currents iqc and idc. However, as shown in FIG. 11, the fixation of the W-phase voltage vw at the positive potential does not allow the U- and V-phase voltages to be raised higher than the W-phase voltage vw. Accordingly, in case the command voltages vuc and vvc are higher than the command voltage vwc, the actual phase-to-phase voltages cannot be made equal to the phase-to-phase voltages which are determined by two of the command voltages vuc, vvc and vwc of the three phases.

Thus, equalization of the actual phase-to-phase voltages with the phase-to-phase voltages determined by two of the command voltages vuc, vvc and vwc of the three phases can be realized only in a section equivalent to an electrical angle 120° in which the W-phase command voltage vwc becomes closer to the positive potential than the command voltages vuc and vvc of other two phases. Therefore, the command voltages vuc and vvc are modulated so that the actual phase-to-phase voltages can be ensured to become equal, in this section, to the phase-to-phase voltages determined by two of the command voltages vuc, vvc and vwc of the three phases. The solid lines in FIG. 11 indicate command voltages vum and vvm resulting from the modulation of the command voltages vuc and vvc, respectively.

Hereinafter is described, in particular, processes that are carried out at the occurrence of short circuit in the inverter 10.

A two-phase modulator 120 modulates command voltages of two phases having no short circuit among the command voltages vuc, vvc and vwc for the three phases, which are outputted from the two-to-three phase converter 92. The switching portion 94 then selects either the command voltages vuc, vvc and vwc for the three phases outputted from the two-to-three phase converter 92, or the modulated command voltages vum, vvm and vwm.

On the other hand, the switching portion 104 selects either the signals gu, gv and gw outputted from the comparators 96, 98 and 100, or a signal of logic "H", or a signal of logic "L".

A failsafe processor 122 operates the switching portions 94 and 104 so that the one-phase short circuit control, the three-phase short circuit control and the two-phase modulation control can be carried out.

The processes carried out by the failsafe processor 122 and the two-phase modulator 120 are now described in more detail.

Figure 12:
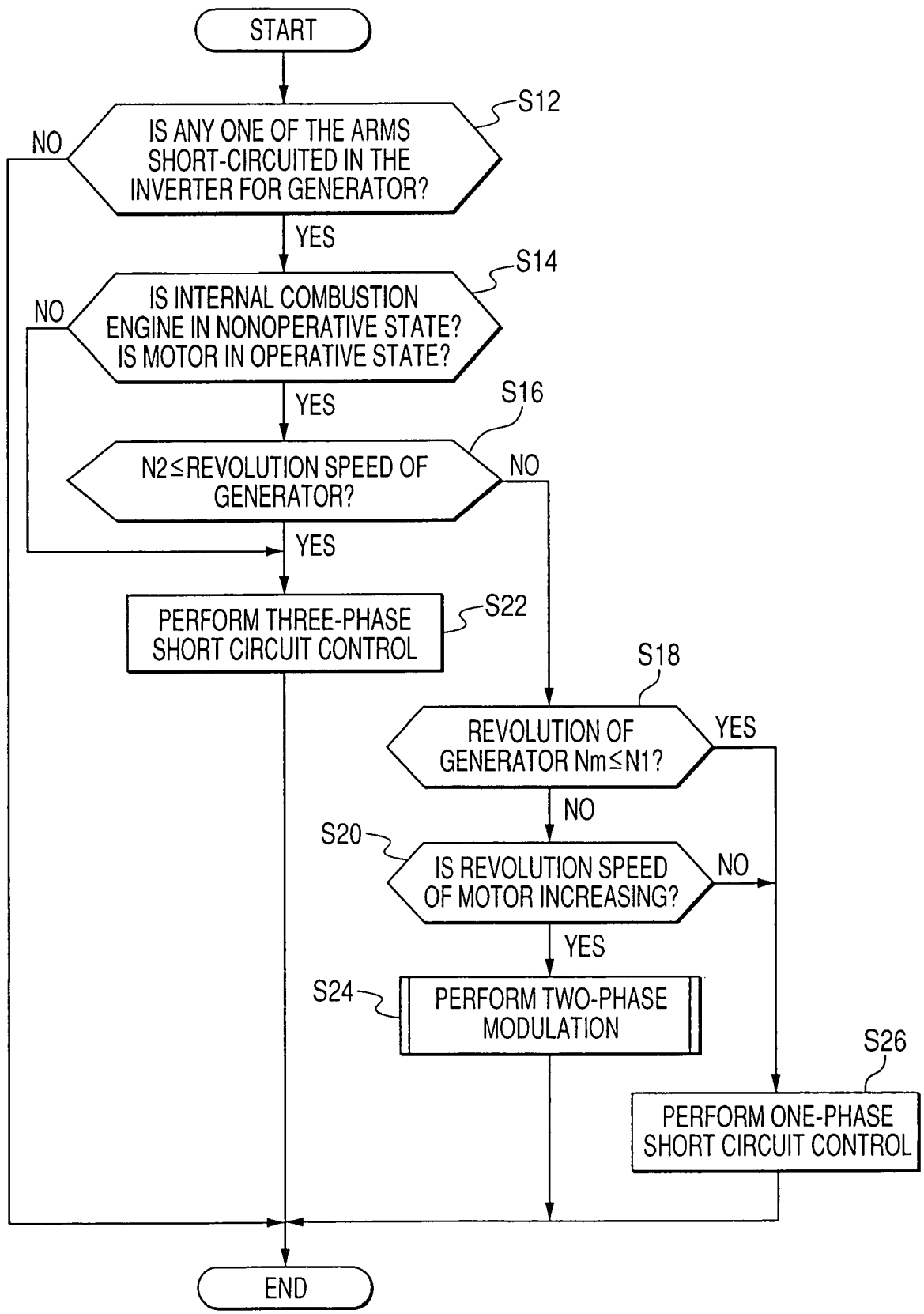
FIG. 12 is a flow diagram illustrating a procedure for failsafe processes at the occurrence of short circuit, according to the first embodiment.

FIG. 12 illustrates a procedure for the processes associated with short circuit. These processes are carried out in predetermined cycles at a predetermined time, for example.

At step S12 in the series of processes, it is determined whether or not short circuit has occurred in either one of the switching elements of a certain arm in the three phases. In this process, the determination on the occurrence of short circuit is made through a short circuit diagnosing process which is carried out based on other logic, not shown, using the scheme described above. If short circuit is determined as having occurred, a determination is made, at step S14, whether or not the internal combustion engine 1 is in a non-operative state and the motor 5 is in an operative state. Specifically, this process is carried out for determining whether or not such a condition has been created that rotation of the internal combustion engine 1 may be initiated depending on the load torque of, the generator 4 despite the non-operative state of the internal combustion engine 1.

If the internal combustion engine 1 is in a non-operative state and the motor 5 is in an operative state, it is determined, at step S16, whether or not the revolution speed of the generator 4 is equal to or more than the revolution speed N2, and it is determined, at step S18, whether or not the revolution speed of the generator 4 is equal to or less than the revolution speed N1. Where the revolution speed Nm of the generator 4 is higher than the revolution speed N1 and lower than the revolution speed N2, it is determined, at step S20, whether or not the revolution speed of the motor 5 is increasing.

Where the revolution speed Nm of the generator 4 is equal to or lower than the revolution speed N1, or where the revolution speed Nm is higher than the revolution speed N1 and lower than the revolution speed N2 while the revolution speed of the motor 5 is not increasing (is decreasing), the one-phase short circuit control is carried out at step S26. In this case, if the revolution speed of the motor 5 is decreasing, the revolution speed of the generator 4 is required to be gradually decreased so as to stop the internal combustion engine 1 irrespective of the decrease in the revolution speed of the motor 5. In this situation therefore, the fact that the load torque of the generator 4 is large is not inconsistent with the requirements for preventing the rotation of the internal combustion engine I from being initiated. Thus, where the revolution speed Nm of the generator 4 is higher than the revolution speed N1 and less than the revolution speed N2 while the revolution speed of the motor 5 is decreasing, the one-phase short circuit control is carried out.

If the revolution speed Nm is equal to or more than the revolution speed N2 while the internal combustion engine I is in operation, the three-phase short circuit control is carried out at step S22. It should be appreciated that the reason for carrying out the three-phase short circuit control during the operation of the internal combustion engine 1 is that the three-phase short circuit control may help decrease the load torque.

If the revolution speed Nm is higher than the revolution speed N1 and less than the revolution speed N2 while the revolution speed of the motor 5 is increasing, processes for the two-phase modulation are carried out at step S24.

Figure 13:
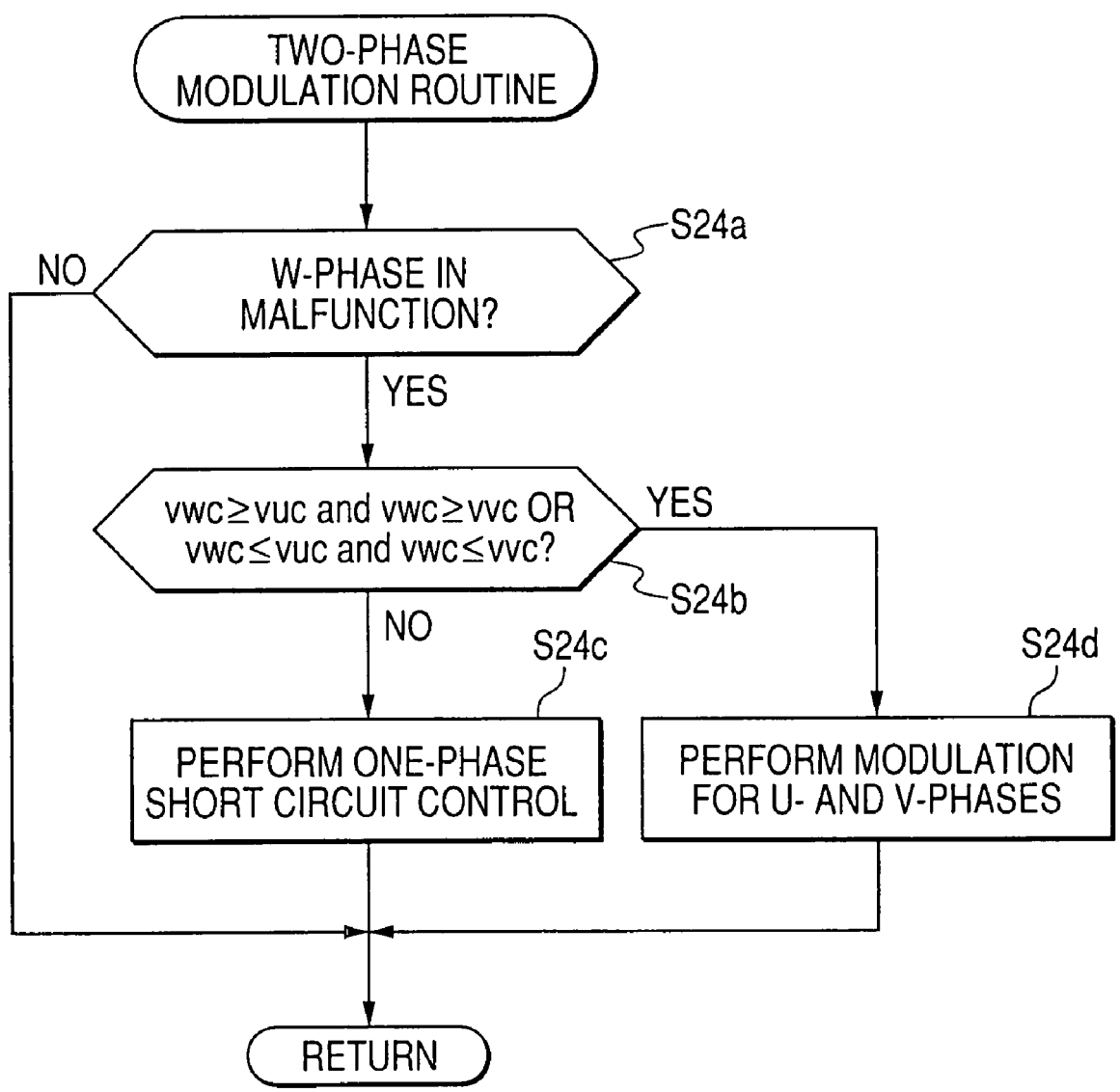
FIG. 13 is a flow diagram illustrating a procedure for two-phase modulation processes among the failsafe processes illustrated in FIG. 12.

FIG. 13 illustrates the processes carried out at step S24 mentioned above. The following description on these processes is provided on the assumption that short circuit has occurred in either one of the W-phase switching elements 12 and 14. As to the other two phases, description is omitted because the description on the W-phase is applicable to them.

A step S24a, the W-phase is determined as to the presence of malfunction therein. If malfunction is determined as being present in the W-phase, it is determined, at step S24b, whether the W-phase command voltage vwc is equal to or larger than the command voltages of other two phases, or whether the W-phase command voltage vwc is equal to or smaller than the command voltages of other two phases. In this case, the command voltages vuc, vvc and vwc are set at values that enable acceleration of the revolution speed of the generator 4 so as to be equal to or higher than the revolution speed N2.

While a negative determination is made at step S24b, the one-phase short circuit control is carried out at step S24c for standing ready. When an affirmative determination is made at step S24b, the command voltages vuc and vvc of the U-phase and V-phase, respectively, are modulated, so that the actual phase-to-phase voltages become equal to the phase-to-phase voltages determined by the command voltages vuc, vvc and vwc. In particular, in the example shown in FIG. 11, for example, modulation is carried out by using the positive potential voltage vp of the inverter 10, so that the modulated command voltages vum and vvm of the U-phase and the V-phase, respectively, may result as follows.

$$vum=vp-vwc+vuc$$

$$vvm=vp-vwc+vvc$$

If a negative determination is made at step S24a mentioned above, the same process is carried out for the U- and V-phases.

After completion of the processes at steps S24c and S24d, control returns to step S24 of FIG. 12.

As described above, the present embodiment can provide the following effects.

(1) In case the inverter 10 for the generator 4 has been determined as having malfunction while the internal combustion engine 1 is in a non-operative state, the rotation of the rotary shaft derived from the motive power of the motor 5, which is transmitted through the torque-splitting mechanism 3, has been limited by operating the electrical conditions of the generator 4. Thus, the occurrence of vibration in the hybrid system can be appropriately suppressed during malfunction of the inverter 10 for the generator 4.

(2) In case short circuit has occurred in the inverter 10 for the generator 4, the load torque of the generator 4 has been controlled, so that the rotation of the rotary shaft of the internal combustion engine 1 is stopped. Thus, the drawbacks accompanying the rotation of the rotary shaft of the internal combustion engine 1 can be appropriately avoided.

(3) Limitation of the rotation has been carried out for the internal combustion engine 1 at the occurrence of short circuit in the inverter 10 for the generator 4 by performing switching operation of the inverter 10. Thus, continuity of current in the generator 4 can be maintained. In addition, generation or the like of arc current can be appropriately avoided, which arc current is caused by zeroing the current in the generator 4.

(4) In case short circuit has occurred in a switching element in a certain arm of the inverter 10 for the generator 4 while the revolution speed of the generator 4 is equal to or higher than the revolution speed N2, the three-phase short circuit control has been carried out, so that switching elements in all of the other arms, which correspond to the subject switching element, are brought into a conducted state. Thus, the increase in the value of the current passing through the generator 4 can be suppressed, the increase in the absolute value of the torque of the generator 4 can be suppressed, and the fluctuations in the torque of the generator 4 can be suppressed.

(5) In case the revolution speed of the generator 4 is equal to or lower than the revolution speed N1, the one-phase short circuit control has been carried out, so that those switching elements functioning normally among the switching elements in the inverter 10 can all be brought into a non-conducted state. Thus, the increase in the absolute value of the load torque of the generator 4 can be suppressed when the revolution speed is equal to or lower than the revolution speed N1, and the fluctuations in the torque of the generator 4 can be suppressed.

(6) In case the revolution speed of the generator 4 is higher than the revolution speed N1 and lower than the revolution speed N2 while the revolution speed of the motor 5 is increasing, acceleration control has been carried out so that the revolution speed of the generator 4 becomes equal to or higher than the revolution speed N2. Thus, the rotation of the internal combustion engine 1 can be appropriately suppressed from being initiated, which rotation would have otherwise been caused by the hovering of the revolution speed in a region where the revolution speed of the generator 4 is higher than the revolution value N1 and lower than the revolution speed N2.

(7) In case the revolution speed of the generator 4 is higher than the revolution speed N1 and lower than the revolution speed N2 while the revolution speed of the motor 5 is increasing, the command voltages of two phases other than the one having malfunction have been modulated, so that the phase-to-phase voltages of the three phases become equal to the phase-to-phase voltages that are determined by the command voltages vuc, vvc and vwc. Thus, the torque of the rotary shaft of the generator 4 can be controlled to a desired level. In addition, the revolution speed of the generator 4 can be promptly transited to a region where the revolution speed is equal to or more than N2.

(8) During ⅓ of a period of the command voltages vuc, vvc and vwc of the three phases, the two-phase modulation control has been carried out. Thus, the torque of the generator 4 can appropriately be controlled to a desired level.

(9) In case the revolution speed of the generator 4 is higher than N1 and lower than N2 while the revolution speed of the motor 5 is increasing, the one-phase short circuit control has been carried out excepting a period during which the two-phase modulation control is carried out. Thus, the increase in the absolute value of the torque can be suppressed over a period standing ready for the two-phase modulation control.

(10) Connection has been established between the rotary shaft of the generator 4 and the sun gear, between the rotary shaft of the motor 5 and the ring gear, and between the rotary shaft of the internal combustion engine 1 and the planetary gear. Thus, the revolution speed of the rotary shaft of the internal combustion engine 1 can be limited by inversely increasing the revolution speed of the generator 4 as the revolution speed of the motor 5 increases.

(11) It has been so arranged that current can be passed through the generator 4 with the counter electromotive force by allowing a DC brushless motor to serve as the generator 4. Thus, the two-phase modulation control or the one-phase short circuit control can appropriately suppress the increase in the load torque of the generator 4 in case the revolution speed is equal to or lower than N2.

Second Embodiment

Hereinafter is described a second embodiment of the present invention focusing on the differences from the first embodiment and referring to the accompanying drawings. In the present embodiment and in the following several embodiments, the identical or similar components to those in the first embodiment are given the same references for the sake of simplifying or omitting explanation.

Figure 14:
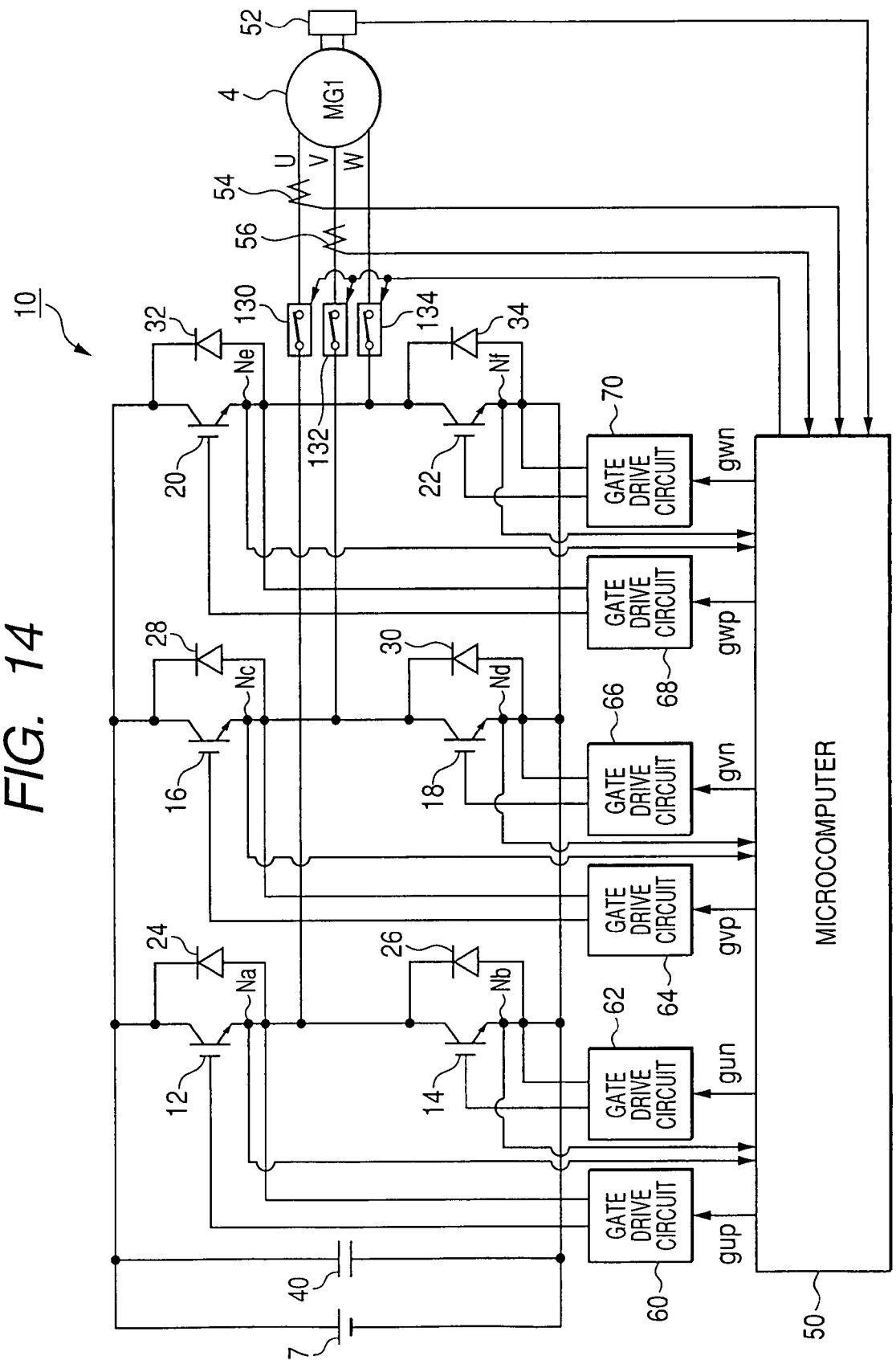
FIG. 14 is a schematic diagram illustrating a configuration including a generator, an inverter and a microcomputer, according to a second embodiment of the present invention.

FIG. 14 illustrates the generator 4, the inverter 10 and the microcomputer 50 associated with the present embodiment.

As shown in FIG. 14, the present embodiment is provided with switching circuits 130, 132 and 134 connecting between the outputs of respective arms of the inverter 10 and the three phases of the generator 4. These switching circuits 130, 132 and 134 are of normally-closed type which, however, may preferably be the ones not closed once brought into an open state. These switching circuits 130, 132 and 134 may be relays provided to an output bus bar, for example.

Figure 15:
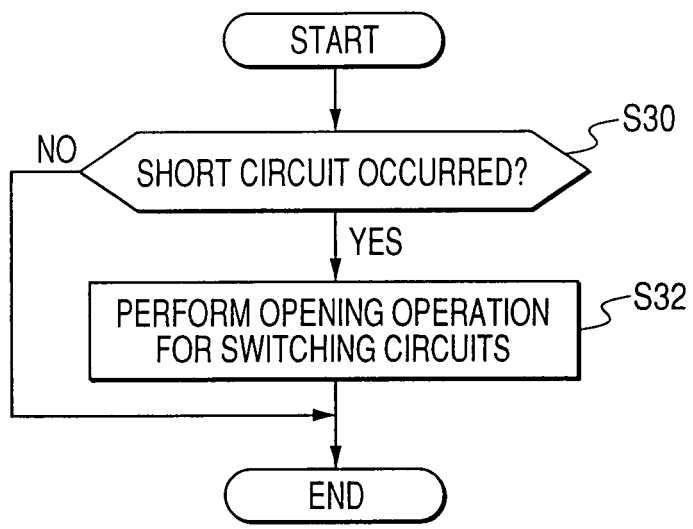
FIG. 15 is a flow diagram illustrating a procedure for failsafe processes at the occurrence of short circuit, according to the second embodiment.

FIG. 15 illustrates a procedure, according to the present embodiment, for processes carried out at the occurrence of short circuit. These processes are carried out in predetermined cycles, for example, by the microcomputer 50. As shown in FIG. 15, when any of the switching elements 12, 14, 16, 18, 20 and 22 of the inverter 10 has been short-circuited (step S30: YES), the switching circuits 130, 132 and 134 are opened (step S32).

The open loops thus formed in the three phases of the generator 4 cause no counter electromotive force, so that the load torque of the generator 4 can substantially be zeroed. This allows the revolution speed of the generator 4 to vary with the possible increase in the revolution speed of the motor 5 so as to keep the stopped state of the internal combustion engine 1.

According to the present embodiment described above, the following effect can be achieved in addition to the effects (1) and (2) set forth in the first embodiment.

(12) In case short circuit is determined as having occurred, the switching circuits 130, 132 and 134 have been brought into a non-conduction state. Thus, the torque of the generator 4 can be substantially zeroed. In addition, the rotation of the rotary shaft of the internal combustion engine 1 can be suppressed.

Third Embodiment

Hereinafter is described a third embodiment according to the present invention focusing on the differences from the second embodiment and referring to the accompanying drawings.

Figure 16:
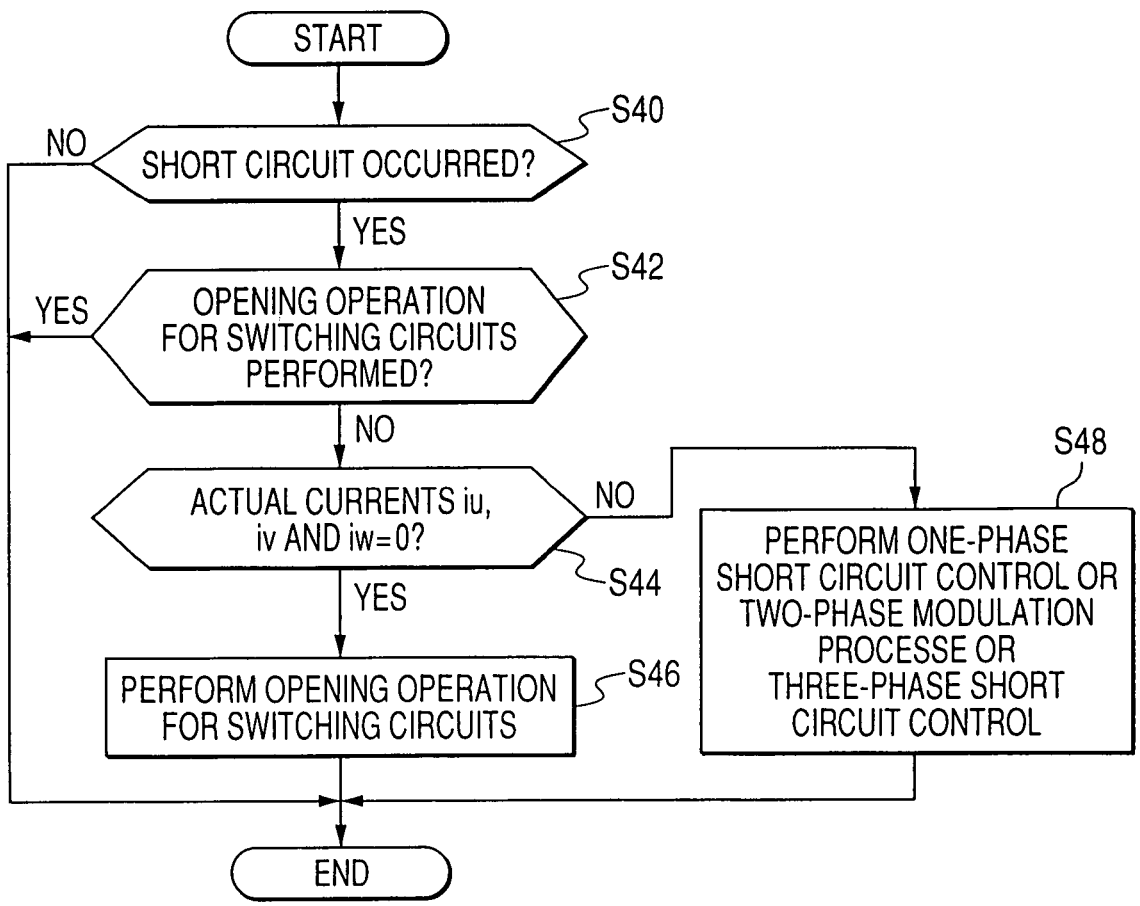
FIG. 16 is a flow diagram illustrating a procedure for failsafe processes at the occurrence of short circuit, according to a third embodiment of the present invention.

FIG. 16 illustrates a procedure, according to the present embodiment, for processes carried out at the occurrence of short circuit. These processes are carried out in predetermined cycles, for example, by the microcomputer 50.

In this series of processes, when any one of the switching elements 12, 14, 16, 18, 20 and 22 is determined as short-circuited (step S40), it is determined, at step S42, whether or not opening operation has already been performed for the switching circuits 130, 132 and 134. In this regard, it is assumed that the switching circuits 130, 132 and 134 keep a closed state once they are opened. Accordingly, in case the opening operation has once been performed, the series of processes shown in FIG. 16 is ended.

On the other hand, in case no opening operation has been performed, it is determined whether or not all of the actual currents iu, ev and iw are zero. If all of the actual currents iu, iv and iw are zero, the opening operation is performed for the switching circuits 130, 132 and 134 at step S46. If all of the actual currents iu, iv and iw are not zero, the processes similar to those in the first embodiment are carried out at step S48.

The following is the reason for performing the opening operation for the switching circuits 130, 132 and 134 in case all of the actual currents iu, iv and iw are zero.

Specifically, arc current should have been caused by forcedly zeroing the actual currents iu, iv and iw by using the switching circuits 130, 132 and 134 while these currents are flowing. Therefore, the switching circuits 130, 132 and 134 are required to be provided with a function for attenuating the arc current. Achieving a configuration for providing such a function to the switching circuits 130, 132 and 134 may necessitate increase in the size of the inverter 10.

According to the present embodiment, such a problem can be prevented because the opening operation is performed when all of the actual currents iu, iv and iw are zero.

As described above, the present embodiment has the following effect in addition to the effects (1) and (2) of the first embodiment and the effect (12) of the second embodiment.

(13) The arc current can be avoided by performing the opening operation when all of the actual currents iu, iv and iw are zero. Thus, the switching circuits 130, 132 and 134 can dispense with having a function of attenuating the arc current.

Fourth Embodiment

Hereinafter is described a fourth embodiment of the present invention focusing on the differences from the first embodiment and referring to the accompanying drawings.

In the first embodiment, the revolution speed of the internal combustion engine 1 has been prevented from falling in the revolution speed region corresponding to the resonance frequency of the flywheel damper 2 by switching controls between the one-phase short circuit control, the two-phase modulation control and the three-phase short circuit control, according to the revolution speed of the generator 4. However, the inventors have found in the first embodiment that these controls may still allow the internal combustion engine 1 to rotate at an extremely low revolution speed.

One possible cause is that, when the load torque generated by the generator 4 is lower than the friction torque of the internal combustion engine 1, the flywheel damper 2 may not necessarily stop. Therefore, it is possible that the flywheel damper 2 may transmit torque to the rotary shaft of the internal combustion engine 1. Another possible cause is that, as have shown in FIG. 5B, the load torque produced in the generator 4 by the one-phase short circuit control may in fact drastically fluctuate against time. In other words, the relation shown in FIG. 10 between the load torque and the revolution speed of the generator 4 under the one-phase short circuit control has a degree of freedom in defining the load torque which fluctuates on the time base. In case the time average value of the individual revolution speeds is defined as being a load torque, the load torque could in fact exceed the friction torque of the internal combustion engine 1. The causes have not been clearly determined so far, but it is true that the inventors actually observed the phenomenon that the internal combustion engine 1 rotated at an extremely low revolution speed.

Figure 17:
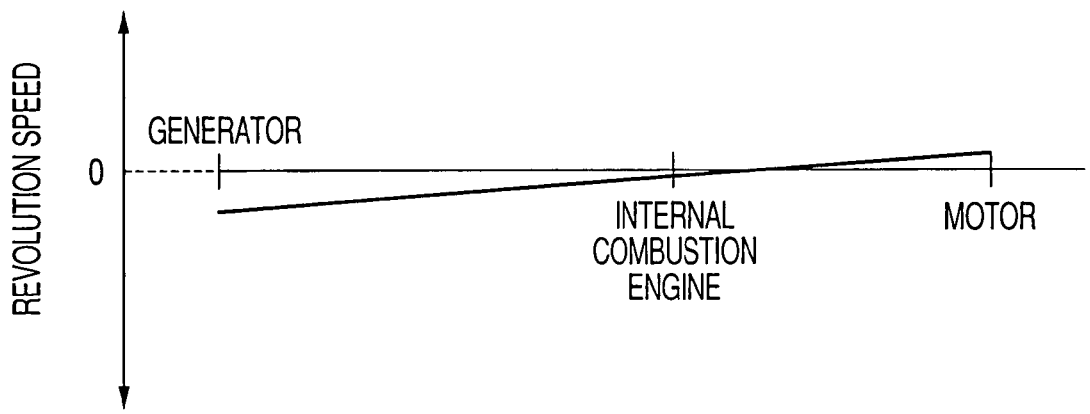
FIG. 17 is an alignment diagram explaining problems associated with a fourth embodiment of the present invention.

In particular, the generator 4 rotates at around 100 rpm while the vehicle travels at an extremely low speed (e.g., 0 to several km/hr). In this case, as shown in FIG. 17, the internal combustion engine 1 may rotate at an extremely low revolution speed caused by the load torque of the generator 4. In this way, rotation at an extremely low revolution speed allows periodical fluctuations of the friction torque at a frequency ranging from around 0 to around 10 Hz in the internal combustion engine 1, being induced by the periodical reciprocation of the piston. Since this frequency coincides with that of a resonance zone of a drive system including the internal combustion engine 1 to the drive wheels 8, the vehicle may vibrate back and forth.

Figure 18:
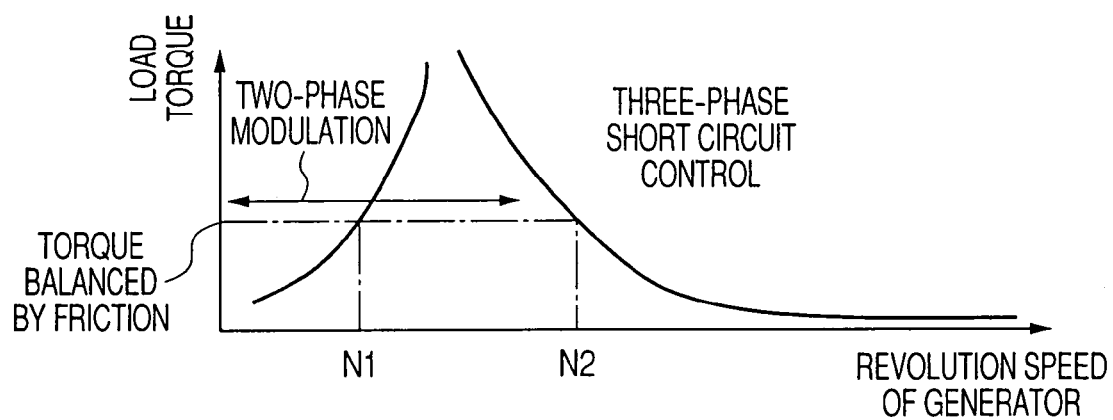
FIG. 18 is an illustration showing a mode of switching in failsafe processes, according to the fourth embodiment.

In order to take measure for this, the present embodiment reduces, as shown in FIG. 18, the load torque of the generator 4 by performing the two-phase modulation control when the revolution speed is lower than N2.

Figure 19:
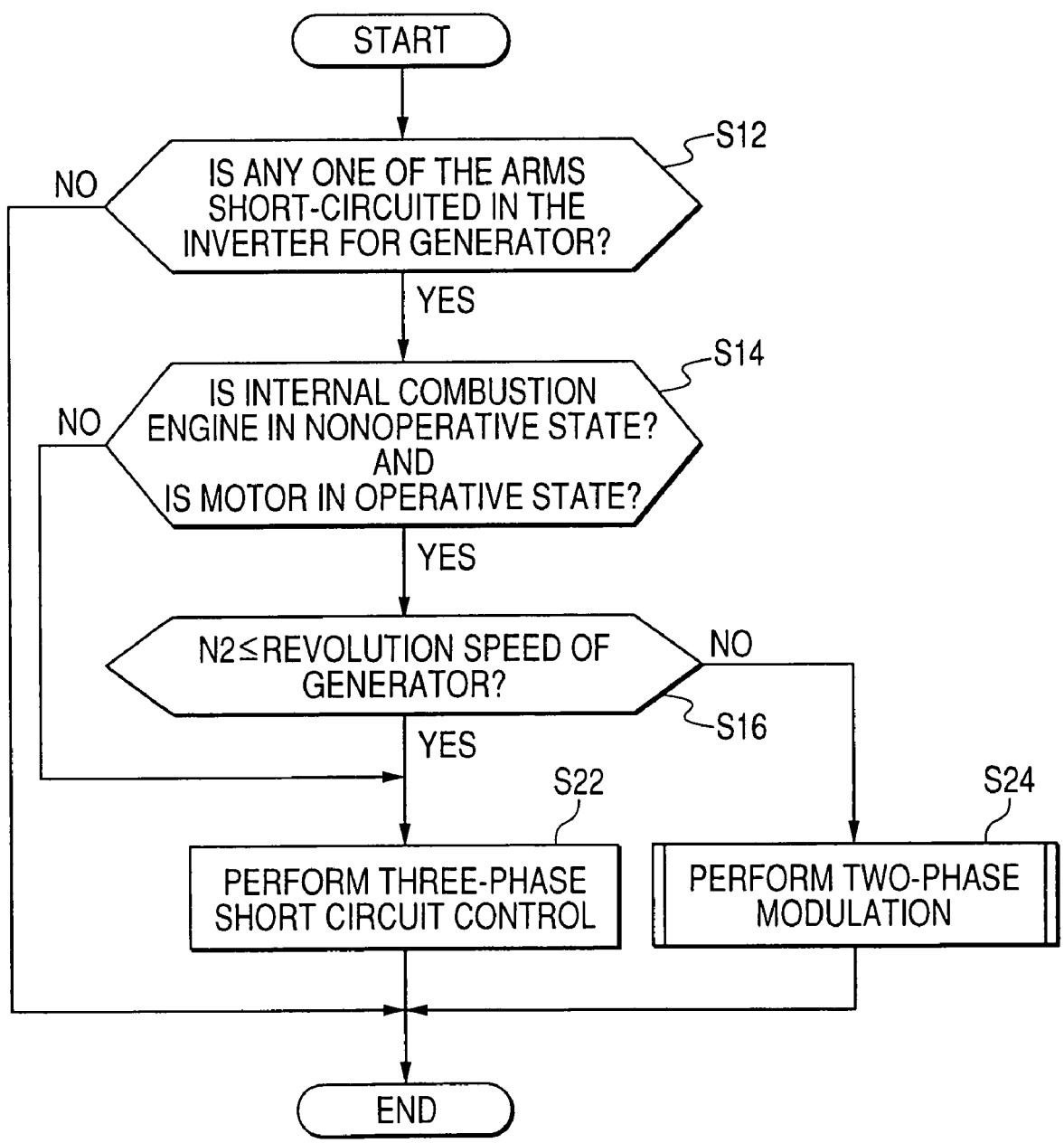
FIG. 19 is a flow diagram illustrating a procedure for the failsafe processes at the occurrence of short circuit, according to the fourth embodiment.

FIG. 19 illustrates a procedure for processes according to the present embodiment, which are carried out at the occurrence of short circuit. These processes are carried out in predetermined cycles.

In this series of processes, when it is determined, at step S16, that the revolution speed of the generator 4 is lower than N2, the two-phase modulation control is carried out at step 524. It should be appreciated that appropriate values for the command voltages vuc, vvc and vwc are preset based on experiments, for example, for the failsafe processes carried out at the occurrence of one-phase short circuit in the inverter 10. In this case, the command voltages vuc, vvc and vwc may be variably set according to the torque demanded for the motor 5 or the revolution speed of the motor 5. However, the setting of the individual command voltages vuc, vvc and vwc may preferably be set separately for the cases where revolution speed of the motor 5 is increasing and not increasing. Specifically, when the revolution speed of the motor 5 is increasing, an acceleration process as in the first embodiment is carried out for raising up the revolution of the generator 4 to be equal to or higher than the revolution speed N2. On the other hand, during deceleration, an appropriate process is carried out for decreasing, as much as possible, the load torque of the generator 4. Both of these processes commonly exert an effect of decreasing the load torque of the generator 4.

Similar to the process shown in FIG. 13, the two-phase modulation processes are carried out over a limited period, which is ⅓ of period of the command voltages, or a period equivalent to an electrical angle 120°. In the remaining period, either one of the one-phase short circuit control and the three-phase short circuit control is carried out. Selection of either one of the one-phase short circuit control and the three-phase short circuit control is made for every vehicle based on load torque characteristics which depend on the structure of the generator 4 and friction characteristics which depend on the structure (e.g., displacement and number of cylinders) of the internal combustion engine 1, whichever may more effectively decrease the rotation of the internal combustion engine 1.

The present embodiment described above has the following effect in addition to the effects (1) to (4), (7), (10) and (11) of the first embodiment.

(14) In case the revolution speed of the rotary shaft of the generator 4 is lower than the revolution speed N2, the two-phase modulation processes have been carried out to modulate the command voltages of the two phases other than the phase having malfunction. Thus, the torque of the rotary shaft of the generator 4 can be controlled to a desired level. Further, the load torque of the rotary shaft can be limited. In addition, in case the revolution speed of the generator 4 is equal to or higher than the revolution speed N2, the three-phase short circuit control may appropriately decrease the load torque of the generator 4 over the, entire revolution speed regions. Thus, rotation of the rotary shaft of the internal combustion engine 1 can be appropriately limited over the entire revolution speed regions of the generator 4.

Fifth Embodiment

Hereinafter is described a fifth embodiment of the present invention focusing on the differences from the first embodiment and revering to the accompanying drawings.

The present embodiment is associated with failsafe processes to be carried out at the occurrence of malfunction in the inverter which is a target of operation in performing output control of the motor 5.

Figure 20:
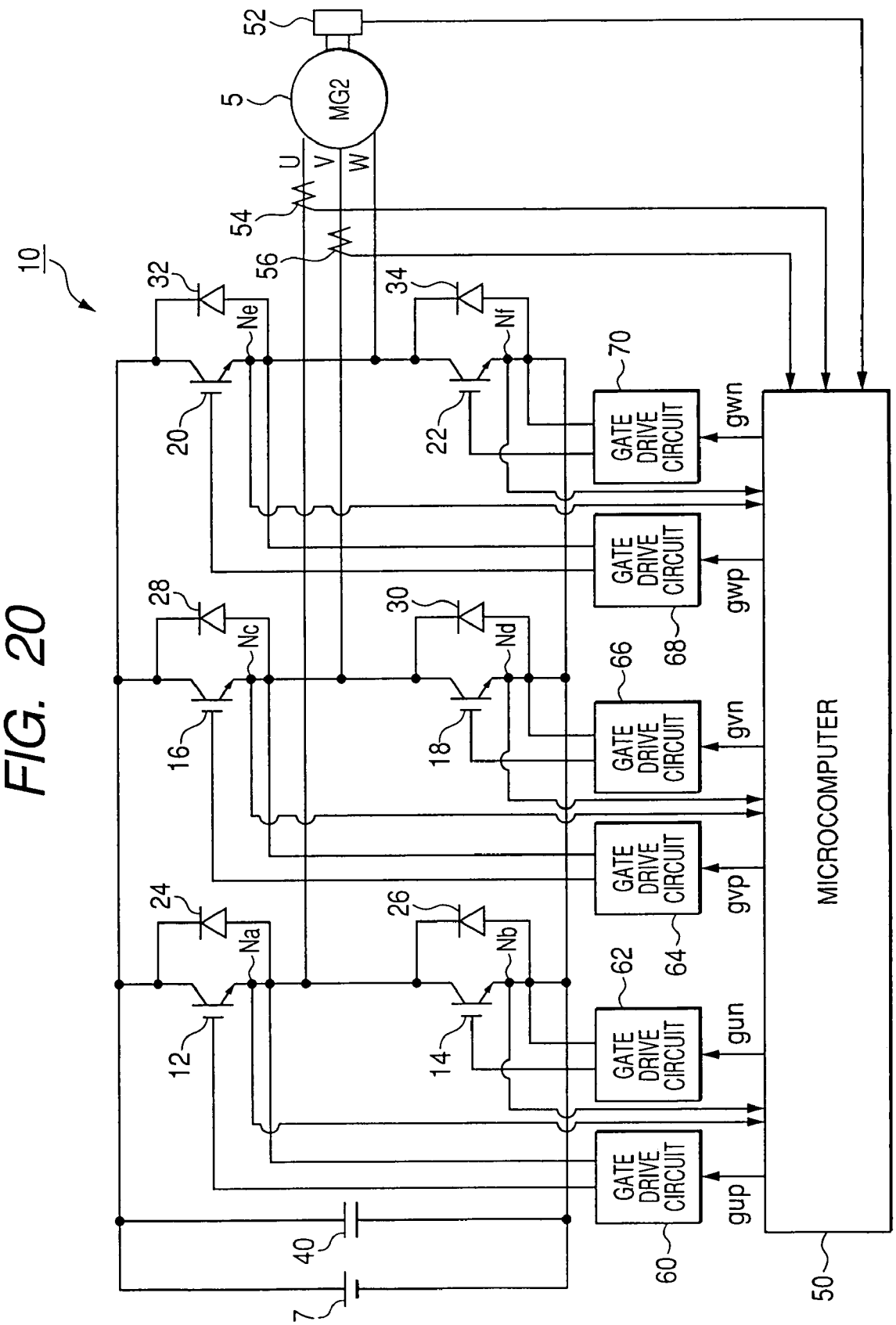
FIG. 20 is a schematic diagram illustrating a configuration including a generator, an inverter and a microcomputer, according to a fifth embodiment of the present invention.

FIG. 20 illustrates in particular a portion of the power control unit 6, which is associated with the control of the motor 5.

When short circuit occurs in either one of the switching elements in an arm of a certain phase, the output torque of the motor 5 cannot be controlled with high accuracy. Therefore, under such circumstances, the present embodiment carries out limp home processes with the internal combustion engine 1. In this case, however, increase in the load torque of the motor 5 may not enable appropriate transmission of the driving force of the internal combustion engine 1 to the drive wheels 8. Also, excessively large current may flow in the motor 5 or the inverter 10.

Figure 21:
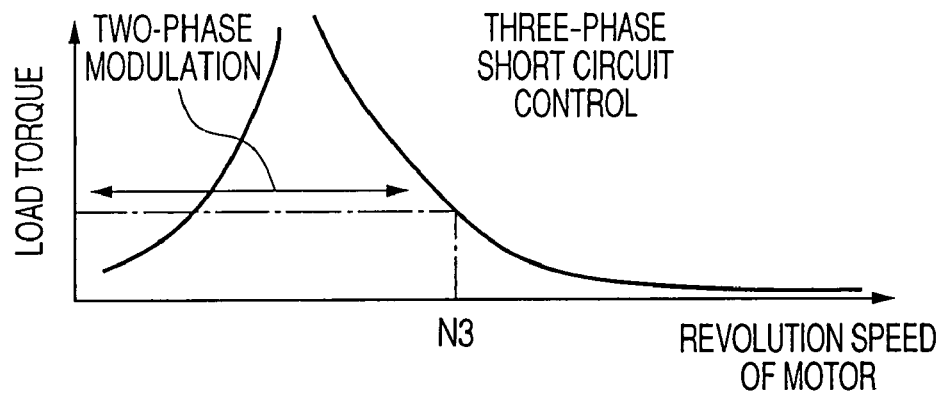
FIG. 21 is an illustration showing a mode of switching in failsafe processes, according to the fifth embodiment.
Figure 22:
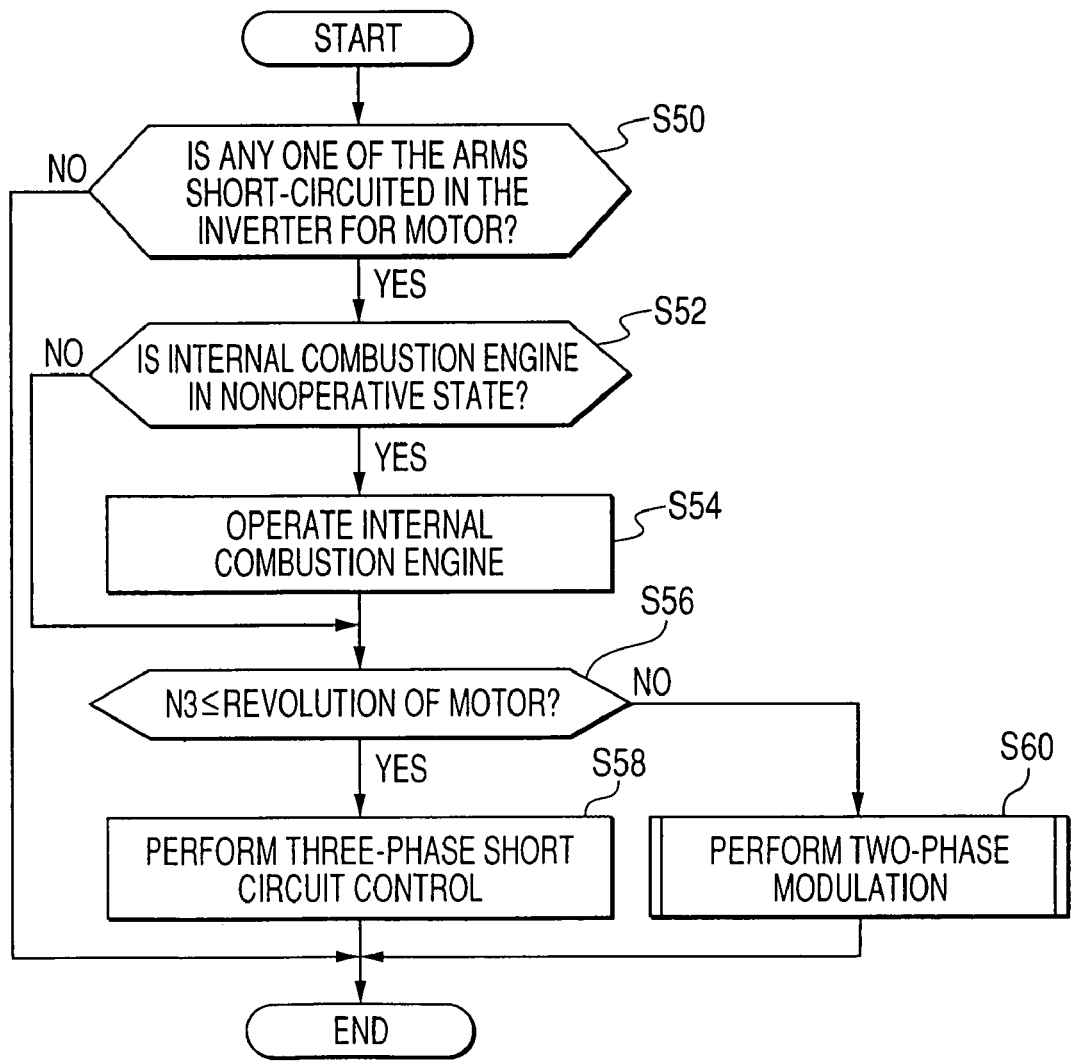
FIG. 22 is a flow diagram illustrating a procedure for the failsafe processes at the occurrence of short circuit, according to the fifth embodiment.

In order to cope with this, the present embodiment performs, as shown in FIG. 21, the three-phase short circuit control when the revolution speed of the motor 5 is equal to or higher than revolution speed N3, and performs the two-phase modulation control when the revolution speed is lower than N3 to give limitation to the load torque of the motor 5. FIG. 22 illustrates a procedure for processes according to the present invention, which are carried out at the occurrence of short circuit in the inverter 10 for the motor 5. These processes are carried out in predetermined cycles, for example.

In this series of processes, it is determined, at step S50, whether or not short circuit has occurred in either one of the switching elements in an arm of a certain phase of the inverter 10 for the motor 5. In this process, the determination on the occurrence of short circuit is made through a short circuit diagnosing process which is carried out based on a logic not shown in the figure associated with the scheme described in the first embodiment. If short circuit is determined as having occurred, a determination is made, at step S52, whether or not the internal combustion engine 1 is in a non-operative state. This determination is purposed to determine whether or not the internal combustion engine 1 is in a state of supplying driving force in place of the motor 5. If the internal combustion engine 1 is determined as being in a non-operative state, the internal combustion engine 1 is operated at step S54.

Upon negative determination at step S52 or completion of the process at step S54, control proceeds to step S56. At step S56, the motor 5 is determined as to whether or not its revolution speed is equal to or higher than the revolution speed N3. The revolution speed N3 is set at a level which may cause load torque in the motor 5 under the three-phase short circuit control but may not prevent supply of the driving force from the internal combustion engine 1 to the drive wheels 8. Thus, if affirmative determination is made at step S56, control proceeds to step S58 where the three-phase short circuit control is performed.

Contrarily, if the determination made at step S56 is negative, control proceeds to step S60 where the two-phase modulation control is performed, so that the load torque of the motor 5 is decreased. It should be appreciated that the command voltages vuc, vvc and vwc in this case are preset at appropriate values based on experiments, for example, for the failsafe processes to be carried out at the occurrence of one-phase short circuit in the inverter 10. In this regard, the command voltages vuc, vvc and vwc may be variably set according, for example, to a demanded torque for the motor 5 or the revolution speed of the motor 5. The demanded torque refers to a torque demanded at the time of limp home. Considering the fact that higher revolution speed causes larger counter electromotive force in the motor 5, amplitudes of the command voltages vuc, vvc and vwc are increased with the increase of the revolution speed.

Similar to the processes shown in FIG. 13, the two-phase modulation processes are carried out over a limited period, which is ⅓ a period of the command voltages, or a period equivalent to an electrical angle 120°. In the remaining period, either one of the one-phase short circuit control and the three-phase short circuit control is carried out. Selection of either one of the one-phase short circuit control and the three-phase short circuit control is made for every vehicle based on load torque characteristics which depend on the structure of the motor 5.

According to the present embodiment described above, appropriate limp home processes can be carried out at the occurrence of short circuit in the motor 5.

Sixth Embodiment

Hereinafter is described a sixth embodiment of the present invention focusing on the differences from the second embodiment and referring to the accompanying drawings.

Figure 23:
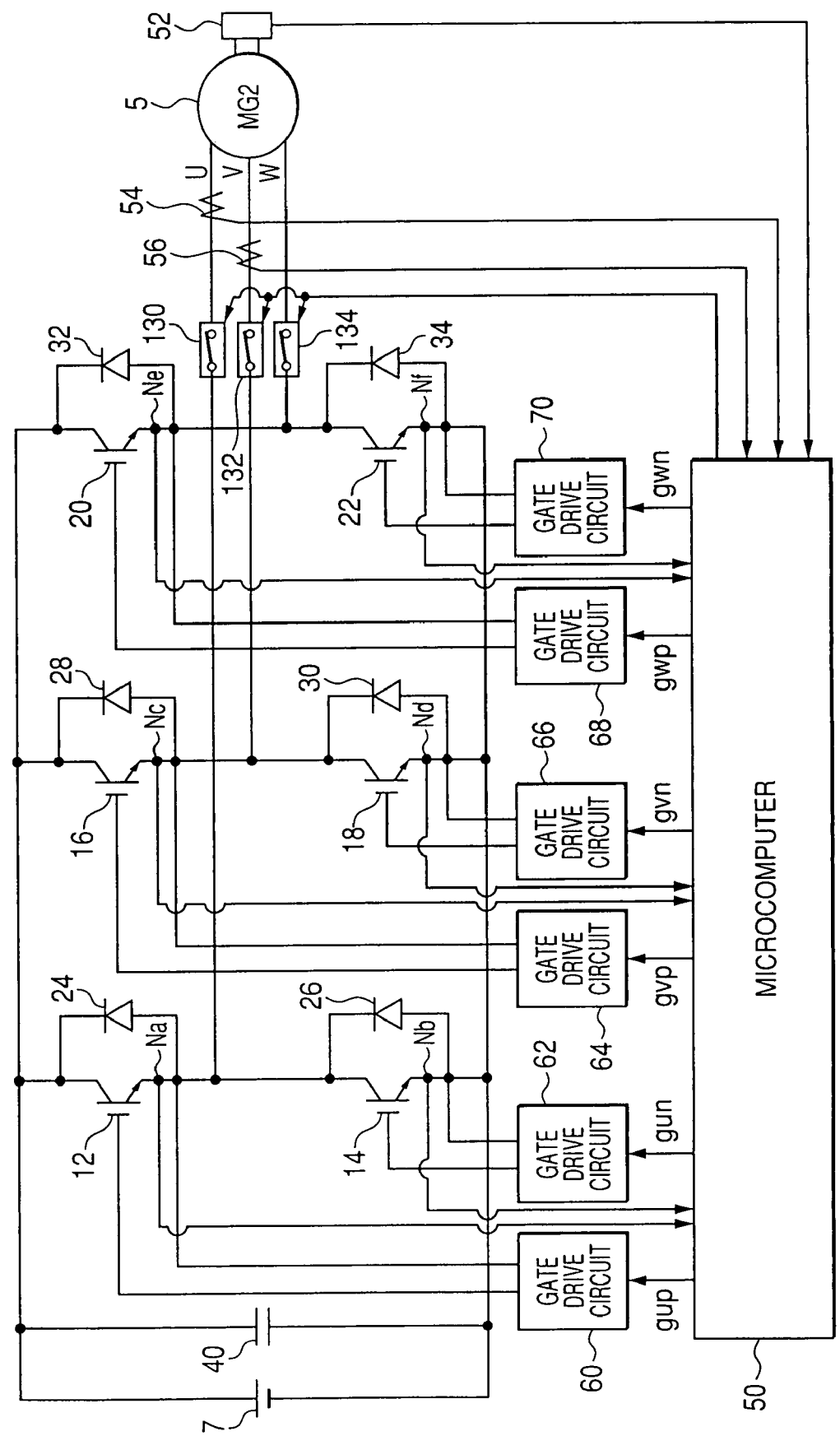
FIG. 23 is a schematic diagram illustrating a configuration including a generator, an inverter and a microcomputer, according to a sixth embodiment of the present invention.

FIG. 23 illustrates the motor 5, the inverter 10 and the microcomputer 50 associated with the present embodiment.

In the present embodiment, the switching circuits 130, 132 and 134 are provided between the outputs of the individual arms of the inverter 10 and the motor 5. At the occurrence of short circuit in either one of the switching elements in an arm of a certain phase of the inverter 10, the opening operation is performed for the switching circuits 130, 132 and 134. Thus, open loops are formed in the respective three phases of the motor 5. Further, counter electromotive force is prevented from occurring, so that the load torque of the motor 5 can be substantially zeroed. As to the scheme for performing the opening operation of the switching circuits 130, 132 and 134, the scheme of the third embodiment may be applicable.

Seventh Embodiment

Hereinafter is described a seventh embodiment of the present embodiment focusing on the differences from the fifth embodiment and referring to the accompanying drawings.

Figure 24:
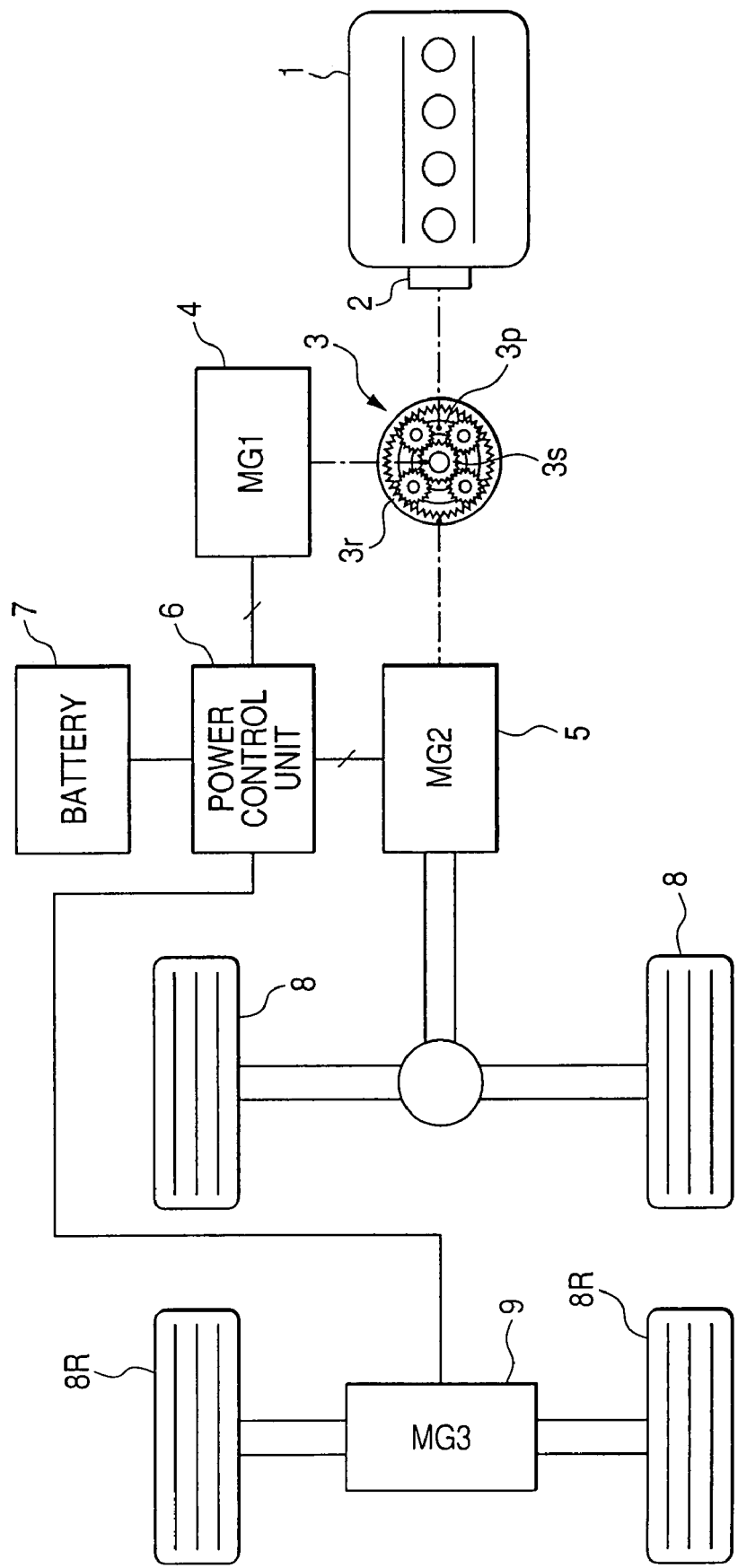
FIG. 24 is a schematic diagram illustrating a general configuration of a system for a hybrid vehicle, according to a seventh embodiment of the present invention.

FIG. 24 illustrates a general configuration of a hybrid system (hybrid vehicle) according to the present embodiment.

As shown in FIG. 24, the hybrid vehicle according to the present embodiment is a four-wheel drive vehicle provided with a second motor 9 (MG3) for transmitting motive force to rear wheels 8R. The second motor 9 is also made up of a DC brushless motor. In this case, if short circuit is caused in either one of the switching elements in an arm of a certain phase of an inverter for the second motor 9, load torque may be produced in the second motor 9, which may induce load torque in the rear wheels 8R. Further, the short circuit may cause unintended braking force while the vehicle is traveling.

Figure 25:
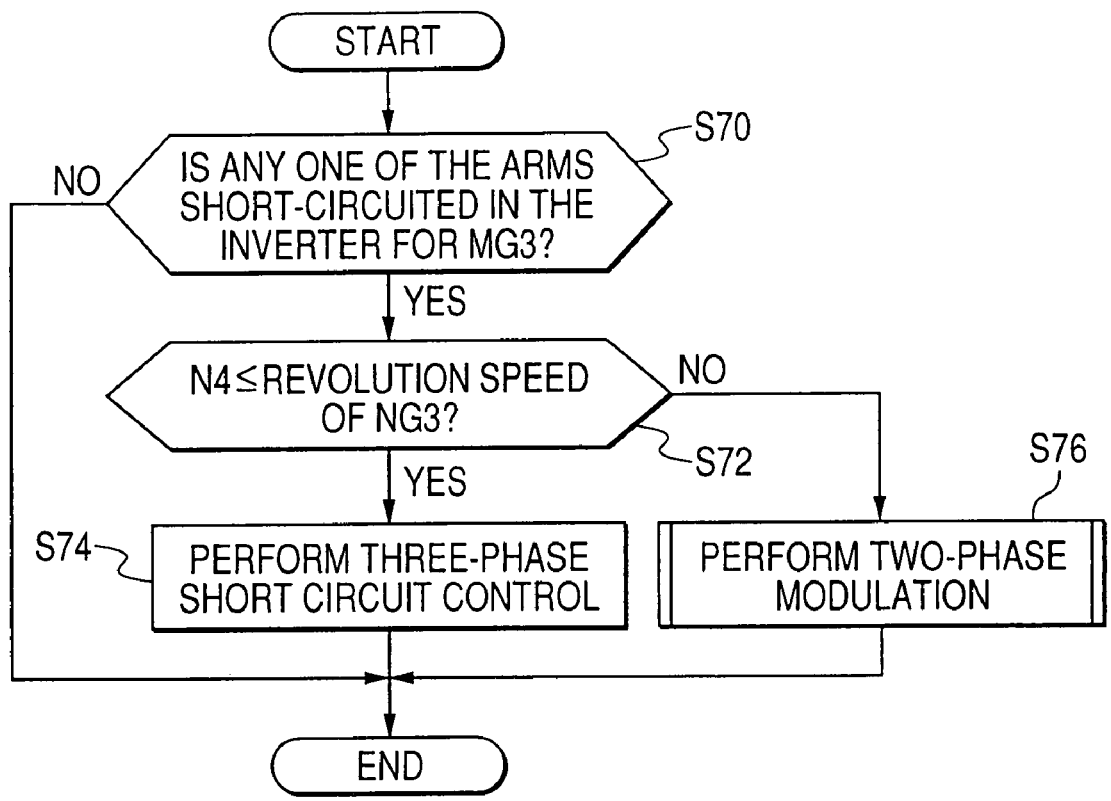
FIG. 25 is a flow diagram illustrating a procedure for failsafe processes at the occurrence of short circuit, according to the seventh embodiment.

To cope with this, the present embodiment performs failsafe processes based on the fifth embodiment in case short circuit has occurred in either one of the switching elements in an arm of a certain phase of the inverter for the second motor 9. FIG. 25 illustrates a procedure for processes according to the present embodiment, which are carried out at the occurrence of short circuit in the inverter for the second motor 9. These processes are carried out in predetermined cycles, for example.

In this series of processes, it is determined, at step S70, whether or not short circuit has occurred in either one of the switching elements in an arm of a certain phase of the inverter for the second motor 9. This process is the same as the one at step S50 of FIG. 22. If malfunction is determined as being present, control proceeds to step S72 where a determination is made as to whether or not the revolution speed of the second motor 9 is equal to or higher than a revolution speed N4. The revolution speed N4 is set at a level, so that the load torque caused in the second motor 9 under the three-phase short circuit control may not affect the vehicle's traveling. If the revolution speed is equal to or higher than the revolution speed N4, the three-phase short circuit control is performed at step S74. Contrarily, if the revolution speed is lower than the revolution speed N4, the two-phase modulation control is performed at step S76. This process is based on the process at step S60 of FIG. 22.

Upon negative determination at step S70 or completion of steps S74 and S76, the series of processes is temporarily ended. If the vehicle has a mode for traveling with only the rear wheels 8R serving as drive wheels, at least one of the internal combustion engine 1 and the motor 5 is preferably operated, when an affirmative determination is made at step S70, so that the vehicle travels with the drive wheels 8.

According to the present embodiment described above, an appropriate measure can be taken at the occurrence of short circuit in the inverter for the second motor 9.

Eighth Embodiment

Hereinafter is described an eighth embodiment of the present invention focusing on the differences from the seventh embodiment and referring to the accompanying drawings.

Figure 26:
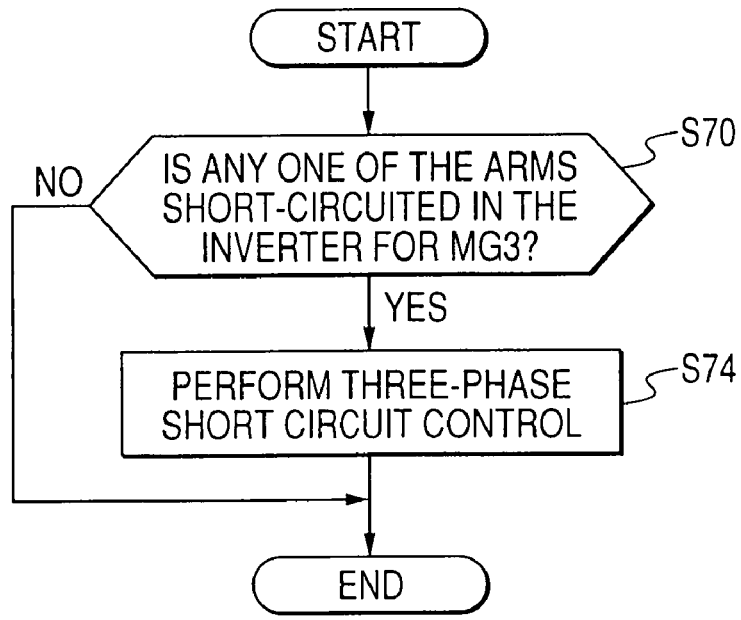
FIG. 26 is a flow diagram illustrating a procedure for failsafe processes at the occurrence of short circuit, according to an eighth embodiment.

FIG. 26 illustrates a procedure for processes according to the present embodiment, which are carried out at the occurrence of short circuit in the inverter for the second motor 9. These processes are carried out in predetermined cycles, for example.

As shown in FIG. 26, the present embodiment performs the three-phase short circuit control at the occurrence of short circuit in the inverter for the second motor 9, irrespective of its revolution speed.

Ninth Embodiment

Hereinafter is described a ninth embodiment of the present invention focusing on the differences from the second embodiment and referring to the accompanying drawings.

Figure 27:
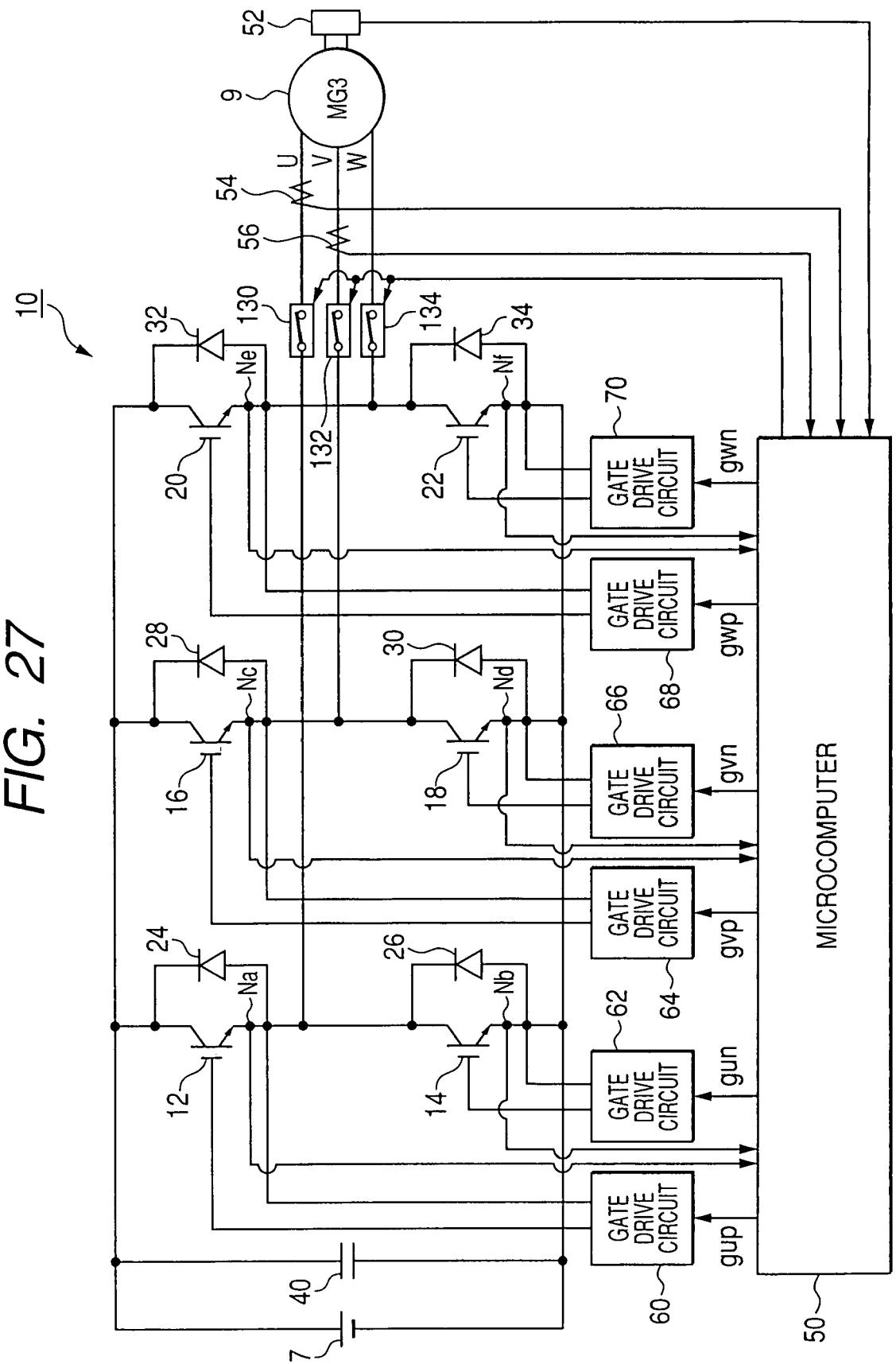
FIG. 27 is a schematic diagram illustrating a configuration including a generator, an inverter and a microcomputer, according to a ninth embodiment of the present invention.

FIG. 27 illustrates the second motor 9, the inverter 10 and the microcomputer 50 associated with the present embodiment.

The present embodiment is provided with the switching circuits 130, 132 and 134 between the outputs of the individual arms of the inverter 10 and the second motor 9. At the occurrence of short circuit in either one of the switching elements in an arm of a certain phase in the inverter 10, the opening operation is performed for the switching circuits 130, 132 and 134. Thus, open loops can be formed in the three phases of the second motor 9. Further, the occurrence of counter electromotive force can be prevented, and the load torque in the second motor 9 can be zeroed. As to the scheme for performing the opening operation for the switching circuits 130, 132 and 134, the scheme for the third embodiment may be applicable.

(Modifications)

The embodiments described above may be modified as follows.

- In the seventh embodiment, the one-phase short circuit control may be performed in case the revolution speed of the second motor 9 is equal to or lower than the predetermined revolution speed, i.e. is lower than the revolution speed N4. Also, in the eighth embodiment, the one-phase short circuit may be performed in case the revolution speed is lower than N4.
- In the second and sixth embodiments, the switching circuits 130, 132 and 134 may not only be of the normally-closed type but may be of normally-open type.
- In the first embodiment, the above effects (1) to (8), (10) and (11) may also be achieved by performing the three-phase short circuit control in a standby period when the revolution speed of the generator 4 is higher than N1 and lower than N2 and when no two-phase modulation control is performed.
- In the first embodiment, the load torque of the generator 4 may also be controlled by performing the two-phase modulation control when the revolution speed of the motor 5 is decreasing while the revolution ;speed of the generator 4 is higher than N1 and lower than N2, so that the revolution speed may become equal to or lower than N1.
- In the first embodiment, the torque of the generator 4 has been controlled so that the revolution of the internal combustion engine 1 is zeroed. However, other measures may be taken including, for example, controlling the generator 4 so that the revolution speed of the internal combustion engine 1 may not fall within a range of the revolution speed corresponding to the resonance frequency of the flywheel damper.
- In the first embodiment, considering that the internal combustion engine 1 is generally driven at a speed equal to or more than an idling revolution speed, the following may be carried out. Specifically, the torque of the generator 4 may be controlled so that the revolution speed of the internal combustion engine 1 becomes lower than the idling revolution speed but not exceeding zero, whereby drawbacks involved in the rotation of the rotary shaft of the internal combustion engine 1 may be appropriately suppressed.
- It may be effective to limit the unintentional initiation of rotation of the rotary shaft of the internal combustion engine 1 in case the region of revolution speed corresponding to the resonance frequency of the flywheel damper is not included in a region where revolution speed is lower than the idling revolution speed.
- The scheme for controlling torque of the generator 4 at the occurrence of short circuit is not limited to the one exemplified such as in the first embodiment. For example, the two-phase modulation control may be performed for all the revolution speed regions to control the torque of the generator 4 so as to limit the rotation of the internal combustion engine 1. In this case, the actual currents iu, iv and iw may preferably be monitored so that the current flowing through the generator 4 may not become excessively large.
- The mode for linking the generator 4, the motor 5 and the internal combustion engine 1 with the individual gears of the planetary gear mechanism should not be limited to the one exemplified in the above embodiments. Further, the torque-splitting mechanism 3 may not necessarily have the planetary gear mechanism. That is to say, the present invention may be effectively applied at any occurrence of short circuit in the inverter 10 for the generator 4, if the rotary shaft of the internal combustion engine 1 may have a risk of being rotated by the motive force of the motor 5 transmitted to the rotary shaft of the internal combustion engine 1 through the torque-splitting mechanism 3, in spite of the fact that the internal combustion engine 1 is not operated.
- The multiphase rotary electric machines (multiphase generators and multiphase motor) to be subjected to torque control at the occurrence of short circuit in the inverter are not limited to DC brushless motors. However, the above embodiments and their modifications may be effectively applied to magnet field type rotary electric machines, for example, one having a configuration that may cause counter electromotive force under the three-phase short circuit control. Because in such a structure, inconveniences may arise by performing the three-phase short circuit control when, for example, the revolution speed of the generator 4 becomes lower than N2 or the revolution speed of the motor 5 becomes lower than N3.
- The non-interactive controller 88 may be omitted by adjusting, for example, the setting of the PI controllers 84 and 86.
- Use of the control system for the multiphase rotary electric machines is not limited to hybrid vehicles. The system of the present invention may be applicable to the control system of electric vehicles, for example, which may cause short circuit in an inverter and may require the three-phase short circuit control. In this case as well, the ninth embodiment may be effectively applied at the occurrence of short circuit in an inverter.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling torque of a rotary shaft of a first rotary electric machine mechanically coupled with both a rotary shaft of a second rotary electric machine and a rotary shaft of an internal combustion engine via a torque-splitting mechanism splitting torque from the internal combustion engine to the first and second rotary electric machines, the first rotary electric machine being composed as a multiphase rotary electric machine, the apparatus comprising:

an inverter used to control the torque of the rotary shaft of the first rotary electric machine;

a determining component determining whether or not a condition is met, the condition being defined such that there is caused a malfunction at the inverter and the internal combustion engine is in a non-operation state; and a limiting component limiting a rotation state of the rotary shaft of the internal combustion engine, which is caused by the second electric machine and transferred via the torque-splitting mechanism from the second rotary electric machine, by operating a drive state of the first rotary electric machine, when it is determined by the determining component that the condition is met.

2. The apparatus of claim 1, wherein the limiting component is configured to limit, when it is determined that the condition is met, a revolution speed of the rotary shaft of the internal combustion engine from entering a revolution speed range which is larger than zero and less than an idling revolution speed of the internal combustion engine.

3. The apparatus of claim 2, wherein
the internal combustion engine is provided with a flywheel damper for suppressing vibration thereof and
the limiting component is configured to limit a revolution speed of the rotary shaft of the internal combustion engine so that the revolution speed is kept away from being present within a revolution speed range corresponding to a resonance frequency of the flywheel damper.

4. The apparatus of claim 3, further comprising an electric-conduction device electrically intervening between the first rotary electric machine and the inverter and being selectively conductive or non-conductive therebetween,
wherein the limiting component comprises means for controlling the electric-conduction device into a non-conducive state, when it is determined by the determining component that the condition is met.

5. The apparatus of claim 3, wherein the limiting component is configured to set the torque of the rotary shaft of the first rotary electric machine to a torque that stops rotation of the rotary shaft of the internal combustion engine.

6. The apparatus of claim 2, further comprising an electric-conduction device electrically intervening between the first rotary electric machine and the inverter and being selectively conductive or non-conductive therebetween,
wherein the limiting component comprises means for controlling the electric-conduction device into a non-conducive state, when it is determined by the determining component that the condition is met.

7. The apparatus of claim 2, wherein the limiting component is configured to set the torque of the rotary shaft of the first rotary electric machine to a torque that stops rotation of the rotary shaft of the internal combustion engine.

8. The apparatus of claim 1, wherein the limiting component is configured to set the torque of the rotary shaft of the first rotary electric machine to a torque that stops rotation of the rotary shaft of the internal combustion engine.

9. The apparatus of claim 8, further comprising an electric-conduction device electrically intervening between the first rotary electric machine and the inverter and being selectively conductive or non-conductive therebetween,
wherein the limiting component comprises means for controlling the electric-conduction device into a non-conducive state, when it is determined by the determining component that the condition is met.

10. The apparatus of claim 1, wherein the limiting component is configured to limit the revolution speed of the rotary shaft of the internal combustion engine by switching the switching elements of the inverter.

11. The apparatus of claim 10, wherein
the malfunction of the inverter is a short-circuit caused at any one of switching elements in each of the respective arms,
the determining component comprises determining means for determining whether or not the rotary shaft of the first rotary eclectic machine rotates at a speed higher than a predetermined revolution speed, and
the limiting component comprises controlling means for controlling all other switching elements into on-states thereof, the other switching elements belonging to phase arms having no short-circuit and being connected to an electric path to which the switching element having the short-circuit malfunction is connected, when it is determined by the determining means that the condition is met.

12. The apparatus of claim 11, wherein
the determining component comprises second determining means for determining whether or not the rotary shaft of the first rotary electric machine rotates at a speed less than a prescribed revolution speed lower than the predetermined revolution speed,
wherein the limiting component comprises second control means for controlling all switching elements having no short-circuit in the inverter into non on-states thereof.

13. The apparatus of claim 12, wherein
the determining component comprises third determining means for determining whether or not the rotary shaft of the first rotary electric machine rotates at a speed between the predetermined revolution speed and the prescribed revolution speed, and
the limiting component comprises third control means for controlling the first rotary electric machine such that the revolution speed of the rotary shaft of the first rotary electric machine is shifted to a speed either higher than the predetermined revolution speed or lower than the prescribed revolution speed.

14. The apparatus of claim 13, wherein the first rotary electric machine is composed as a three-phase rotary electric machine;
the apparatus further comprises a calculating component calculating three-phase command signal voltages for controlling output torque of the first rotary electric machine to a desired torque; and the limiting component comprises modulating means for modulating two-phase command voltages other than one-phase command voltage assigned to the malfunction such that the three-phase rotary electric machine has three-phase phase-to-phase voltages which are equal to voltages to be defined by the calculated three-phase command voltages, when it is determined by the third determining means that the rotary shaft of the three-phase rotary electric machine rotates at the speed between the predetermined revolution speed and the prescribed revolution speed.

15. The apparatus of claim 14, wherein the modulating means is configured to modulate the two-phase command voltages during ⅓ of a period of the three-phase command voltages.

16. The apparatus of claim 15, wherein
the determining component comprises fourth determining means for determining whether or not a condition is met, the condition being defined such that the rotary shaft of the three-phase rotary electric machine rotates at the speed between the predetermined revolution speed and the prescribed revolution speed and a current time instant is outside the period of time during which the modulating means performs the modulation, and
the limiting component comprise fourth control means for controlling all switching elements having no short-circuit in the inverter into non on-states thereof, when it is determined by the fourth determining means that the condition is met.

17. The apparatus of claim 10, wherein the first rotary electric machine is composed as a three-phase rotary electric machine;
the apparatus further comprises a calculating component calculating three-phase command signal voltages for controlling output torque of the first rotary electric machine to a desired torque;
the malfunction of the inverter is a short-circuit caused at any one of switching elements in each of the respective arms;
the determining component comprises determining means for determining whether or not the rotary shaft of the first rotary eclectic machine rotates at a speed less than a predetermined revolution speed; and
the limiting component comprises modulating means for modulating two-phase command voltages other than one-phase command voltage assigned to the malfunction such that the three-phase rotary electric machine has three-phase phase-to-phase voltages which are equal to voltages to be defined by the calculated three-phase command voltages, when it is determined by the determining means that the rotary shaft of the three-phase rotary electric machine rotates at the speed less than the predetermined revolution speed.

18. The apparatus of claim 17, wherein the modulating means is configured to modulate the two-phase command voltages during ⅓ of a period of the three-phase command voltages.

19. The apparatus of claim 1, further comprising an electric-conduction device electrically intervening between the first rotary electric machine and the inverter and being selectively conductive or non-conductive therebetween,
wherein the limiting component comprises means for controlling the electric-conduction device into a non-conducive state, when it is determined by the determining component that the condition is met.

20. The apparatus of claim 1, wherein
the torque-splitting mechanism is provided with a planetary gear mechanism including a sun gear, a ring gear, and a planetary, wherein the rotary shaft of the first rotary electric machine is coupled with the sun gear, the rotary shaft of the second rotary electric machine is coupled with the ring gear, and the rotary shaft of the internal combustion engine is coupled with the planetary gear, respectively.

21. The apparatus of claim 1, wherein the first rotary electric machine is formed as a magnet field type electric rotary machine.

22. An apparatus for controlling an output of a multiphase rotary electric machine by operating on/off states of an inverter comprising a plurality of phase arms each composed of a plurality of switching elements respectively being turned on/off, the multiphase rotary electric machine having a rotary shaft mechanically coupled with a rotary shaft of an internal combustion engine, comprising:
a determining component determining whether or not a condition is met in an operation state of the internal combustion engine, the condition being defined such that there is a short-circuit malfunction caused at any one of the switching elements of any one of the phases and the multiphase rotary electric machine rotates at a speed higher than a predetermined speed; and
a control component performing control such that all other switching elements are made to be on-state, the other switching elements belonging to phase arms having no short-circuit and being connected to an electric path to which the switching element having the short-circuit malfunction is connected, when it is determined by the determining component that the condition is met in the operation state of the internal combustion engine.

23. The apparatus of claim 22, wherein
the multiphase rotary electric machine is composed as a three-phase rotary electric machine,
the apparatus further comprising:
a calculating component calculating three-phase command signal voltages for controlling output torque of the three-phase rotary electric machine to a desired torque;
a further determining component determining whether or not a further condition is met, the further condition being defined such that there is caused the short-circuit malfunction and the three-phase rotary electric machine rotates at a speed equal to or less than the predetermined speed; and
a modulating component modulating two-phase command voltages other than one-phase command voltage assigned to the malfunction such that the three-phase rotary electric machine has three-phase phase-to-phase voltages which are equal to voltages to be defined by the calculated three-phase command voltages, when it is determined by the further determining component that the further condition is met.

24. The apparatus of claim 22, wherein
the multiphase rotary electric machine is a multiphase electric motor and
the controlling component is composed of a control unit incorporated in a system equipped with a motor differently from the multiphase rotary electric motor.

25. An apparatus for controlling an output of a multiphase rotary electric machine by operating on/off states of an inverter comprising a plurality of phase arms each composed of a plurality of switching elements respectively being turned on/off, comprising:

an electric-conduction device electrically intervening between the multiphase rotary electric machine and the inverter and being selectively conductive or non-conductive therebetween;

a determining component determining whether or not a condition is met, the condition being defined such that there is a short-circuit malfunction caused at any one of the switching elements of any one of the phase arms; and a controlling component controlling the electric-conduction device into a non-conductive state, when it is determined by the determining component such that the condition is met.

26. The apparatus of claim 25, wherein the multiphase rotary electric machine is a multiphase electric motor and the controlling component is composed of a control unit incorporated in a system equipped with a motor differently from the multiphase rotary electric motor.

27. An apparatus for controlling torque of a rotary shaft of a multiphase electric motor mechanically coupled with both a rotary shaft of a rotary electric machine and a rotary shaft of an internal combustion engine via a torque-splitting mechanism splitting torque from the internal combustion engine to the multiphase electric motor and the rotary electric machine, the apparatus comprising:

a determining component determining whether or not there is caused a malfunction at the inverter in a non-operation state of the internal combustion engine; and a limiting component limiting a load torque of the multiphase electric motor by operating electric states of the multiphase electric motor, when it is determined by the determining component that there is caused the malfunction in the non-operation state of the internal combustion engine.

28. The apparatus of claim 27, wherein the limiting component is configured to limit the load torque through on/off operations of the switching elements of the inverter.

29. The apparatus of claim 28, further comprising a further determining component determining the three-phase electric motor rotates at a speed equal to or higher than a predetermined speed, wherein the limiting component further comprises control means for performing control such that all other switching elements are made to be on-state, the other switching elements belonging to phase arms having no short-circuit and being connected to an electric path to which the switching element having the short-circuit malfunction is connected, when it is determined by the further determining component that the three-phase electric motor rotates at the speed equal to or higher than a predetermined speed.

30. The apparatus of claim 27, further comprising:

an electric-conduction device electrically intervening between the multiphase electric motor and the inverter and being selectively conductive or non-conduction therebetween, wherein the limiting component comprises controlling means for controlling the electric-conduction device to be non-conductive, when it is determined by the determining component such that the condition is met.

31. The apparatus of claim 27, wherein the multiphase electric motor is formed as a magnet field type electric rotary machine.

32. An apparatus for controlling torque of a rotary shaft of a multiphase electric motor mechanically coupled with both a rotary shaft of a rotary electric machine and a rotary shaft of an internal combustion engine via a torque-splitting mechanism splitting torque from the internal combustion engine to the multiphase electric motor and the rotary electric machine, the apparatus comprising:

a determining component determining whether or not there is caused a malfunction at the inverter;

a limiting component limiting a load torque of multiphase electric motor by operating electric states of the multiphase electric motor, when it is determined by the determining component that there is caused the malfunction;

a further determining component determining whether or not the internal combustion engine is in a non-operation state; and an operation commanding component commanding the internal combustion engine to operate, when it is determined that there is caused the malfunction at the inverter and the internal combustion engine is in the non-operation state.

33. The apparatus of claim 32, wherein the limiting component is configured to limit the load torque through on/off operations of the switching elements of the inverter.

34. The apparatus of claim 32, wherein the torque-splitting mechanism is provided with a planetary gear mechanism including a sun gear, a ring gear, and a planetary, wherein the rotary shaft of the rotary electric machine is coupled with the sun gear, the rotary shaft of the multiphase electric motor is coupled with the ring gear, and the rotary shaft of the internal combustion engine is coupled with the planetary gear, respectively.

35. The apparatus of claim 32, wherein the multiphase electric motor is formed as a magnet field type electric rotary machine.

36. The apparatus of claim 32, further comprising an electric-conduction device electrically intervening between the multiphase electric motor and the inverter and being selectively conductive or non-conduction therebetween, wherein the limiting component comprises controlling means for controlling the electric-conduction device to be non-conductive, when it is determined by the determining component such that the condition is met.

37. An apparatus for controlling torque of a rotary shaft of a multiphase electric motor mechanically coupled with both a rotary shaft of a rotary electric machine and a rotary shaft of an internal combustion engine via a torque-splitting mechanism splitting torque from the internal combustion engine to the multiphase electric motor and the rotary electric machine, the apparatus comprising:

a determining component determining whether or not there is caused a malfunction at the inverter; and a limiting component limiting a load torque of the multiphase electric motor by operating electric states of the multiphase electric motor, when it is determined by the determining component that there is caused the malfunction;

wherein the multiphase electric motor is composed as a three-phase electric motor, the malfunction caused at the inverter is a short-circuit caused at either one of switching elements belonging to each phase arm of the inverter, and the limiting component is configured to limit the load torque through on/off operations of the switching elements of the inverter and comprises calculating means for calculating three-phase command signal voltages for controlling output torque of the three-phase electric motor to a desired torque, and modulating means for modulating two-phase command voltages other than one-phase command voltage assigned to the malfunction such that the three-phase electric motor has three-phase phase-to-phase voltage which are equal to voltages to be defined by the calculated three-phase command voltages.

38. The apparatus of claim 37, further comprising a further determining component determining the three-phase electric motor rotates at a speed equal to or higher than a predetermined speed,
   wherein the limiting component further comprises control means for performing control such that all other switching elements are made to be on-state, the other switching elements belonging to phase arms having no short-circuit and being connected to an electric path to which the switching element having the short-circuit malfunction is connected, when it is determined by the further determining component that the three-phase electric motor rotates at the speed equal to or higher than a predetermined speed.

39. An apparatus for controlling torque of a rotary shaft of a multiphase electric motor mechanically coupled with both a rotary shaft of a rotary electric machine and a rotary shaft of an internal combustion engine via a torque-splitting mechanism splitting torque from the internal combustion engine to the multiphase electric motor and the rotary electric machine, the apparatus comprising:
   a determining component determining whether or not there is caused a malfunction at the inverter; and
   a limiting component limiting a load toque of the multiphase electric motor by operating electric states of the multiphase electric motor, when it is determined by the determining component that there is caused the malfunction: wherein
   the torque-splitting mechanism is provided with a planetary gear mechanism including a sun gear, a ring gear, and a planetary, wherein the rotary shaft of the rotary electric machine is coupled with the sun gear, the rotary shaft of the multiphase electric motor is coupled with the ring gear, and the rotary shaft of the internal combustion engine is coupled with the planetary gear, respectively.

\* \* \* \* \*